United States Patent
Wiley et al.

(10) Patent No.: US 9,137,008 B2
(45) Date of Patent: Sep. 15, 2015

(54) THREE PHASE CLOCK RECOVERY DELAY CALIBRATION

(71) Applicant: QUALCOMM Incorporated, San Diego, CA (US)

(72) Inventors: George Alan Wiley, San Diego, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/336,572

(22) Filed: Jul. 21, 2014

(65) Prior Publication Data

US 2015/0030112 A1   Jan. 29, 2015

Related U.S. Application Data

(60) Provisional application No. 61/857,572, filed on Jul. 23, 2013.

(51) Int. Cl.
*H04L 25/02* (2006.01)
*H04L 7/033* (2006.01)
*H04B 3/02* (2006.01)
*G06F 13/42* (2006.01)

(52) U.S. Cl.
CPC ............ *H04L 7/033* (2013.01); *G06F 13/4295* (2013.01); *H04B 3/02* (2013.01); *H04L 25/0272* (2013.01)

(58) Field of Classification Search
CPC ............ H04B 3/02; H04B 3/462; H03L 7/00; H04L 7/0033; H04L 7/0037; H04L 7/033; H04L 25/0272; H04L 7/0337
USPC .......................... 375/257, 288, 293, 355, 360
See application file for complete search history.

(56) References Cited

U.S. PATENT DOCUMENTS

| | | | |
|---|---|---|---|
| 7,142,621 B2 | 11/2006 | Vallet et al. | |
| 7,567,629 B2 | 7/2009 | Fredriksson | |
| 7,844,021 B2 | 11/2010 | Gibbons et al. | |
| 8,294,501 B1 | 10/2012 | Thomas et al. | |
| 8,615,063 B2 | 12/2013 | Lin et al. | |
| 2007/0014340 A1* | 1/2007 | McGee | 375/257 |
| 2008/0212709 A1 | 9/2008 | Wiley et al. | |
| 2009/0003464 A1* | 1/2009 | Matsubara et al. | 375/257 |
| 2009/0195699 A1* | 8/2009 | Hamada et al. | 348/721 |
| 2010/0215118 A1* | 8/2010 | Ware et al. | 375/295 |
| 2011/0150251 A1 | 6/2011 | Solum et al. | |
| 2011/0208989 A1 | 8/2011 | Nygren et al. | |

OTHER PUBLICATIONS

International Search Report and Written Opinion—PCT/US2014/047571—ISA/EPO—Oct. 1, 2014.

* cited by examiner

*Primary Examiner* — Betsy Deppe
(74) *Attorney, Agent, or Firm* — Loza & Loza, LLP

(57) ABSTRACT

System, methods and apparatus are described that facilitate transmission of data, particularly between two devices within an electronic apparatus. Information is transmitted in N-phase polarity encoded symbols. A clock recovery circuit may be calibrated based on state transitions in a preamble transmitted on two or more connectors. A calibration method is described. The method includes detecting a plurality of transitions in a preamble of a multiphase signal and calibrating a delay element to provide a delay that matches a clocking period of the multiphase signal. Each transition may be detected by only one of a plurality of detectors. The delay element may be calibrated based on time intervals between detections of successive ones of the plurality of transitions.

30 Claims, 16 Drawing Sheets

THREE PHASE CLOCK RECOVERY DELAY CALIBRATION

CROSS-REFERENCE TO RELATED APPLICATIONS

This application claims priority to and the benefit of U.S. provisional patent application No. 61/857,572 filed on Jul. 23, 2013, the entire content of which application is incorporated herein by reference.

TECHNICAL FIELD

The present disclosure relates generally to high-speed data communications interfaces, and more particularly, calibration of clocking in multi-wire, multiphase data communication links.

BACKGROUND

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. Application processors, displays and/or other devices may be interconnected using a physical interface that may be standards-based or proprietary in design. In one example, a display component may provide an interface that conforms to the Display System Interface (DSI) standard specified by the Mobile Industry Processor Interface Alliance (MIPI).

In a multi-wire interface, the maximum speed of the communication link and the ability of a clock-data recovery (CDR) circuit may be limited by the maximum time variation related to transitions of signals transmitted on the communication link. Transitions on different wires may exhibit different variations in signal transition times, which can cause the outputs of receivers in a receiving device to change at different times with respect to a data or symbol boundary. Large transition time differences in multi-wire signals often requires the implementation of a delay element in the CDR circuit, where the delay element has a minimum delay that is at least as long as the difference between the min and max receiver transition events. The maximum time of this delay element can restrict the throughput on the communication link by significantly limiting the period of the transmission clock. Moreover, the maximum time of the delay element may vary with operating conditions, including power, voltage and temperature.

SUMMARY

Embodiments disclosed herein provide systems, methods and apparatus that enable calibration of clocks used in multiphase transmission systems. Calibration may be performed for each transmission of a multiphase signal and calibration allows for tighter operating margins of data recovery circuits. The apparatus may include a mobile terminal having multiple Integrated Circuit (IC) devices may be collocated in an electronic apparatus and communicatively coupled through one or more data links.

In various aspects of the disclosure, a calibration method includes a calibration method that includes detecting a series of transitions in signaling state of three or more wires of a multi-wire communications interface. Each transition in the series of transitions may correspond to a boundary between consecutive symbols in a preamble transmitted on the multi-wire communications interface. In an aspect, the calibration method includes deriving a receive clock from the series of transitions, determining a transition region based on the series of transitions, and calibrating a delay period corresponding to a duration of the transition region. In an aspect, the calibration method includes receiving data symbols from the multi-wire communications interface after termination of the preamble. The data symbols may be received using a version of the receive clock that is modified based on the delay period.

In an aspect, the data symbols may be received by detecting a first-detected transition corresponding to a boundary between a first data symbol and a second data symbol, and ignoring other transition detections for a period of time based on the delay period, and capturing a current data symbol after the period of time has elapsed. The ignored transition detections may correspond to the same boundary between the first data symbol and the second data symbol.

In an aspect, calibrating the delay period includes estimating differences in timing between transitions in the series of transitions, and calculating the delay period based on a maximum one of the differences in timing. The differences in timing between transitions in the series of transitions may be estimated relative to the receive clock. The delay period may be calibrated using a successive approximation algorithm or a linear search algorithm.

In an aspect, each transition in the series of transitions is detected by a single one of a plurality of detectors. Each detector in the plurality of detectors may be configured to determine a difference between signaling state of two wires of the multi-wire communications interface. The two wires may carry different versions of a multiphase signal. The plurality of detectors may include differential receivers. Each differential receiver may be configured to receive signals from a different pair of wires than the other differential receivers.

In an aspect, the preamble is based on a gray code. The preamble may include a sequence of symbols identified in control information communicated between a transmitting device and a receiving device coupled to the multi-wire communications interface.

In various aspects of the disclosure, an apparatus includes means for detecting a series of transitions in signaling state of three or more wires of a multi-wire communications interface. Each transition in the series of transitions may correspond to a boundary between consecutive symbols in a preamble transmitted on the multi-wire communications interface. In an aspect, the apparatus includes means for deriving a receive clock from the series of transitions, means for determining a transition region based on the series of transitions, and means for calibrating a delay period corresponding to a duration of the transition region. In an aspect the apparatus includes means for receiving data symbols from the multi-wire communications interface after termination of the preamble. The data symbols may be received using a version of the receive clock that is modified based on the delay period.

In various aspects of the disclosure, an apparatus includes a processing circuit configured to detect a series of transitions in signaling state of three or more wires of a multi-wire communications interface. Each transition in the series of transitions may correspond to a boundary between consecutive symbols in a preamble transmitted on the multi-wire communications interface. In an aspect the processing circuit may be configured to derive a receive clock from the series of transitions, determine a transition region based on the series of transitions, calibrate a delay period corresponding to a duration of the transition region, and receive data symbols from the multi-wire communications interface after termination of the preamble. The data symbols may be received using a version of the receive clock that is modified based on the delay period.

In various aspects of the disclosure, a processor-readable storage medium may have one or more instructions which, when executed by at least one processing circuit, cause the at least one processing circuit to detect a series of transitions in signaling state of three or more wires of a multi-wire communications interface. Each transition in the series of transitions may correspond to a boundary between consecutive symbols in a preamble transmitted on the multi-wire communications interface. In an aspect the instructions may cause the processing circuit to derive a receive clock from the series of transitions, determine a transition region based on the series of transitions, and calibrate a delay period corresponding to a duration of the transition region. In an aspect the instructions may cause the processing circuit to receive data symbols from the multi-wire communications interface after termination of the preamble. The data symbols may be received using a version of the receive clock that is modified based on the delay period. The processor-readable storage medium may include a non-transitory storage medium.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
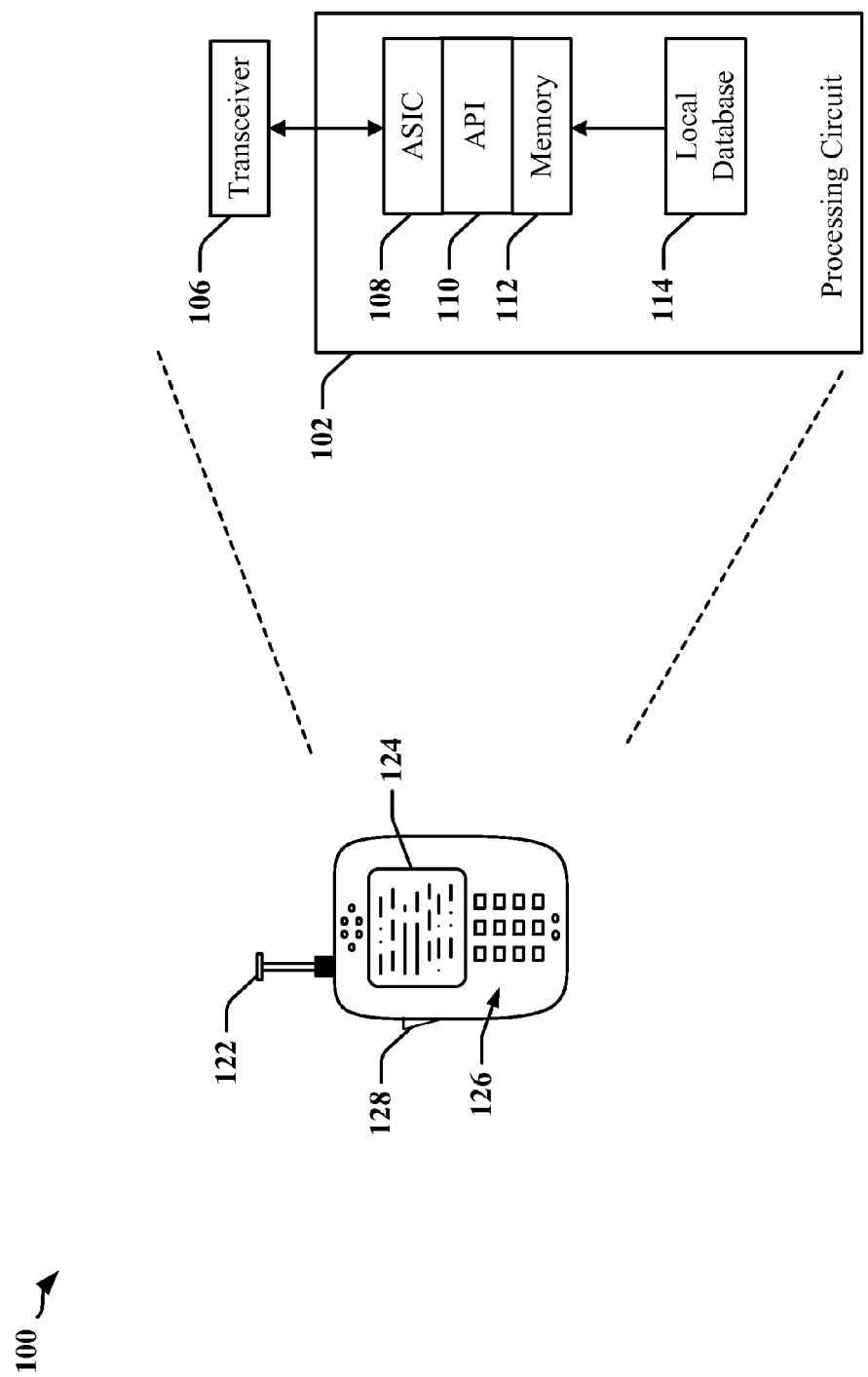
FIG. 1 depicts an apparatus employing a data link between IC devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts a simplified example of an apparatus that employs a communication link between IC devices. The apparatus 100 may include a communications transceiver 106 operably coupled to a processing circuit 102. In one example, the apparatus 100 may include a wireless communication device that communicates through an RF transceiver 106 with a radio access network (RAN), a core access network, the Internet and/or another network. The processing circuit 102 may include an application-specific IC (ASIC) 108 and/or one or more other IC devices. The ASIC 108 may include one or more processing devices, logic circuits, and so on. The processing circuit 102 may include and/or be coupled to processor readable storage such as a memory 112 that may maintain instructions that may be executed by a processor of the processing circuit 102 and data, which may be manipulated by the processing circuit 102. Certain functions of the processing circuit 102 may be controlled by one or more of an operating system and an application programming interface (API) 110 layer that supports and enables execution of software modules residing in storage media, such as the memory device 112. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit 102 may also be operably coupled to external devices such as an antenna 122, a display 124, operator controls, such as a keypad 126, a button, rocker or slider switch 128, and/or other components.

Figure 2:
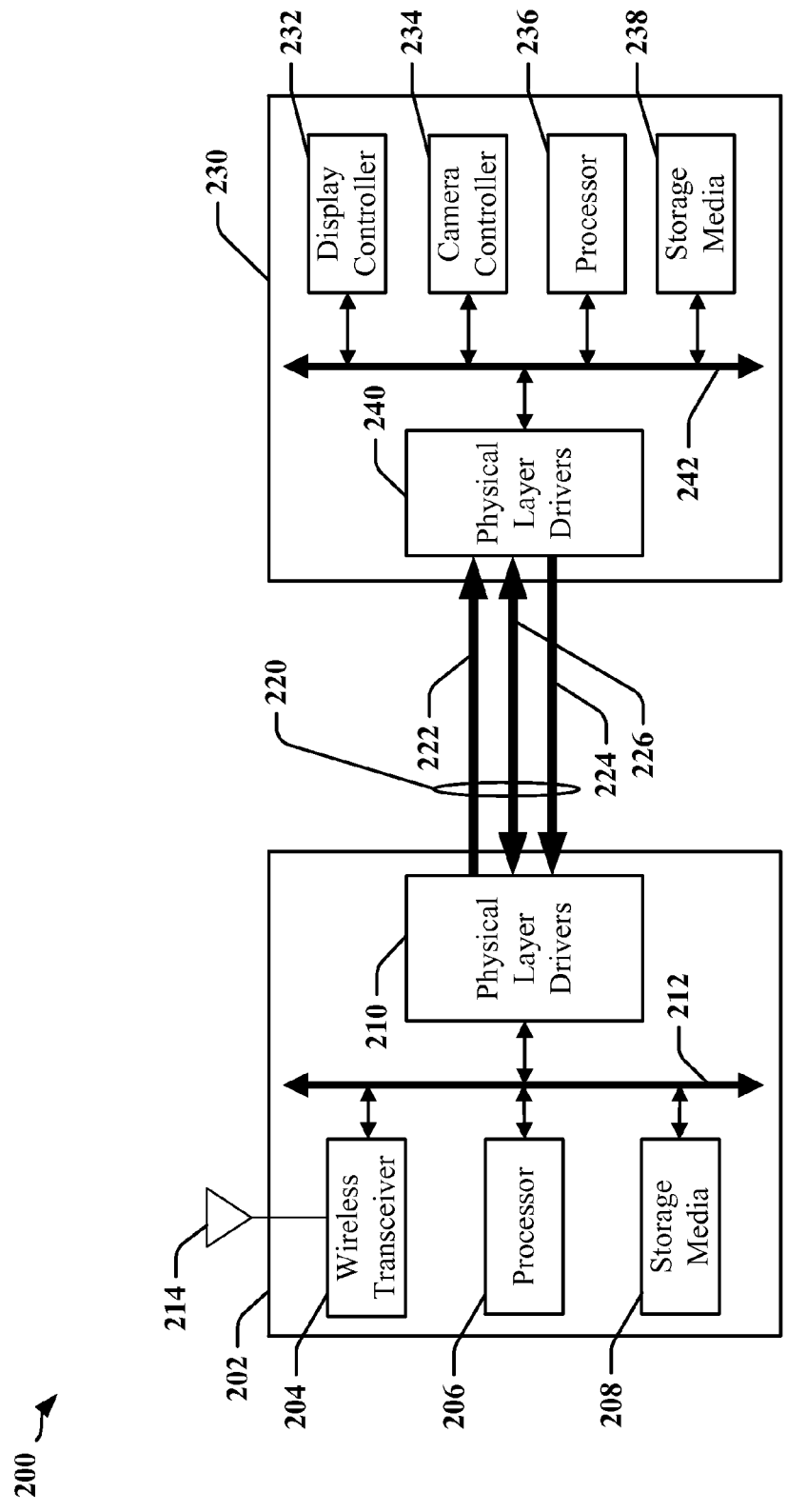
FIG. 2 illustrates a system architecture for an apparatus employing a data link between IC devices that selectively operates according to one of plurality of available standards.

FIG. 2 is a block schematic diagram illustrating certain aspects of an apparatus 200 such as a wireless mobile device, a mobile telephone, a mobile computing system, a wireless telephone, a notebook computer, a tablet computing device, a media player, a gaming device, an appliance, a wearable computing device, or the like. The apparatus 200 may include a plurality of IC devices 202 and 230 that exchange data and control information through a communication link 220. The communication link 220 may be used to connect the IC devices 202 and 230, whether the IC devices 202, 230 are located in close proximity to one another, or located in physically different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels/links 222, 224 and 226. One or more channel 226 may be bidirectional, and may operate in a half-duplex mode and/or in a full-duplex mode. One or more channel 222 and 224 may be unidirectional. The communication link 220 may be asymmetrical, providing higher bandwidth in one direction. In one example, a first communications channel 222 may be referred to as a forward link 222 while a second communications channel 224 may be referred to as a reverse link 224. The first IC device 202 may be designated as a host system or a transmitter, while the second IC device 230 may be designated as a client system or a receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor 206, 236, which may be provided on a processing circuit, computing circuit, or other device. In one example, the first IC device 202 may be adapted to perform core functions of the apparatus 200, including maintaining wireless communications through a wireless transceiver 204 and an antenna 214, while the second IC device 230 may be configured to support a user interface that manages or operates a display controller 232, and may control operations of a camera or video input device using a camera controller 234. Other features supported by one or more of the IC devices 202 and 230 may include a keyboard, a voice-recognition component, global positioning systems, biometric recognition systems, motion sensors, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

Reverse link 224 may be operated in the same manner as the forward link 222, and the forward link 222 and reverse link 224 may be capable of transmitting at comparable speeds or at different speeds, where speed may be expressed as a data rate (or data transfer rate) and/or a transmitter clocking rate. The forward and reverse data rates may be substantially the same or may differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate data, control, command and other information between the first IC device 202 and the second IC device 230 in accordance with an industry or other standard.

Industry standards may be application specific. In one example, the MIPI standard defines physical layer interfaces including a synchronous interface specification (D-PHY) between an application processor IC device 202 and an IC device 230 that supports the camera or display in a mobile device. The D-PHY specification governs the operational characteristics of products that comply with MIPI specifications for mobile devices. A D-PHY interface may support data transfers using a flexible, low-cost, high-speed serial interface that interconnects between the IC devices 202 and 230 within a mobile device. These interfaces may include complimentary metal-oxide-semiconductor (CMOS) parallel busses providing relatively low bit rates with slow edges to avoid electromagnetic interference (EMI) issues.

The communication link 220 of FIG. 2 may be implemented as a wired bus that includes a plurality of signal wires (denoted as M wires). The M wires may be configured to carry N-phase encoded data in a high-speed digital interface, such as in a display interface. The M wires may facilitate N-phase polarity encoding on one or more of the channels 222, 224 and 226. The physical layer drivers 210 and 240 may be configured or adapted to generate N-phase polarity encoded data symbols for transmission on the communication link 220, and/or to decode N-phase polarity encoded data symbols received from the communication link 220. The use of N-phase polarity encoding provides high speed data transfer and may consume half or less of the power of other interfaces because fewer drivers are active in N-phase polarity encoded data links/channels (within the communication link 220).

N-phase polarity encoding devices (within the physical layer drivers 210 and/or 240) can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
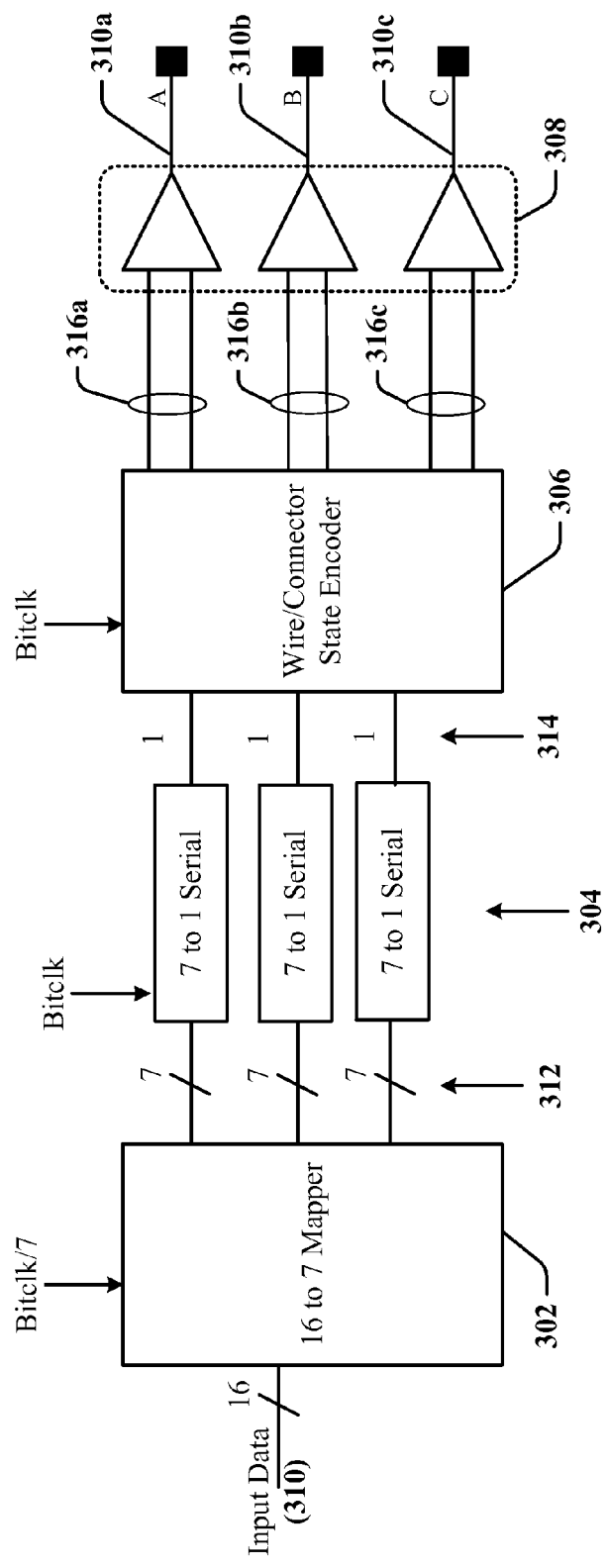
FIG. 3 illustrates an N-phase polarity data encoder.

FIG. 3 is a schematic diagram illustrating an M-wire, N-phase polarity encoder 300 that may be used to implement certain aspects of the communication link 220 depicted in FIG. 2. In the example depicted, the M-wire, N-phase polarity encoder transmitter is configured to transmit information using M=3 wires and N=3 phase signaling. The example of 3-wire, 3-phase encoding is selected solely for the purpose of simplifying descriptions of certain aspects of the invention.

The principles and techniques disclosed for 3-wire, 3-phase encoders can be applied in other configurations of M-wire, N-phase polarity encoders and decoders.

Signaling states defined for each of the M wires in an M-wire, N-phase polarity encoding scheme may include an undriven state, a positively driven state and a negatively driven state. In the 3-wire, 3-phase polarity encoding scheme, the positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c. The undriven state may be realized by placing an output of a driver of a signal wire 310a, 310b or 310c in a high-impedance mode. Alternatively, or additionally, an undriven state may be obtained on a signal wire 310a, 310b or 310c by passively or actively causing an "undriven" signal wire 310a, 310b or 310c to assume a voltage level that lies substantially halfway between positive and negative voltage levels provided on driven signal wires 310a, 310b and/or 310c. Typically, no significant current flows through an undriven signal wire 310a, 310b or 310c. Signaling states defined for a 3-wire, 3-phase polarity encoding scheme may be denoted using the three signaling states {+1, 0, −1}, which may represent voltage or current states. In one example, the three states {+1, 0, −1} may signify the three voltage levels +V, 0, −V. In another example, the three states {+1, 0, −1} may signify the three voltage levels +V, +V/2, 0. In another example, the three states {+1, 0, −1} may signify currents of I, 0, −I.

A 3-wire, 3-phase, polarity encoder may employ a set of drivers 308 to control the signaling state of connectors 310a, 310b and 310c. The drivers 308 may be implemented as unit-level current-mode or voltage-mode drivers. Each driver 308 may receive a set of signals 316a, 316b or 316c that determines the signaling state of corresponding connector 310a, 310b or 310c. In the example depicted, each of the drivers 308 receives a pair of signals 316a, 316b or 316c that defines four states for the corresponding connector 310a, 310b or 310c. In another example, each driver 308 may receive a set of three signals defining 8 states for the corresponding connector 310a, 310b, or 310c.

For each transmitted symbol interval in an M-wire, N-phase polarity encoding scheme, at least one signal wire 310a, 310b or 310c is in the undriven state (0 signaling state), while the number of positively driven (+1 signaling state) signal wires 310a, 310b or 310c is equal to the number of negatively driven (−1 signaling state) signal wires 310a, 310b or 310c, such that the sum of current flowing to the receiver is zero. At each symbol transition, between the previously transmitted symbol and a next transmitted symbol, the state of at least one signal wire 310a, 310b or 310c changes. When the signaling state of at least one signal wire 310a, 310b and/or 310c changed between each pair of consecutive symbols, a receiver can reliably generate a receive clock based on the transitions.

In operation, a mapper 302 may receive and map input data 310 to a set of symbols 312. In the depicted 3-wire, 3-phase example, the set of symbols includes seven 3-bit symbols such that a 16-bit word of the input data 310 may be encoded in each set of symbols. Each bit of a 3-bit symbol defines the state of one of the signal wires 310a, 310b and 310c for one symbol interval. The sequence of symbols 312 may be serialized using parallel-to-serial converters 304 that provide a timed sequence of symbols 314, each symbol defining the signaling state of the 3-wires 310a, 310b and 310c. The sequence of symbols 314 is typically timed using a transmission clock to delineate symbol intervals, whereby a single symbol is transmitted in each symbol interval. An M-wire phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols. A non-integer number of data bits may be encoded in each symbol. In the example of a 3-wire, 3-phase system, there are 3 available combinations of 2 wires that may be driven simultaneously, and 2 possible combinations of polarity on the pair of wires that is driven, yielding 6 possible states. The signaling state of the signal wires 310a, 310b and 310c changes at each transition between symbols and, accordingly, 5 of the 6 states are available at every transition. In other words, the state of at least one wire changes at each transition to permit a receiver to generate a reliable receive clock and, given a current signaling state, there are five possible signaling states available at each transition. With 5 states, $\log_2(5) \approx 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
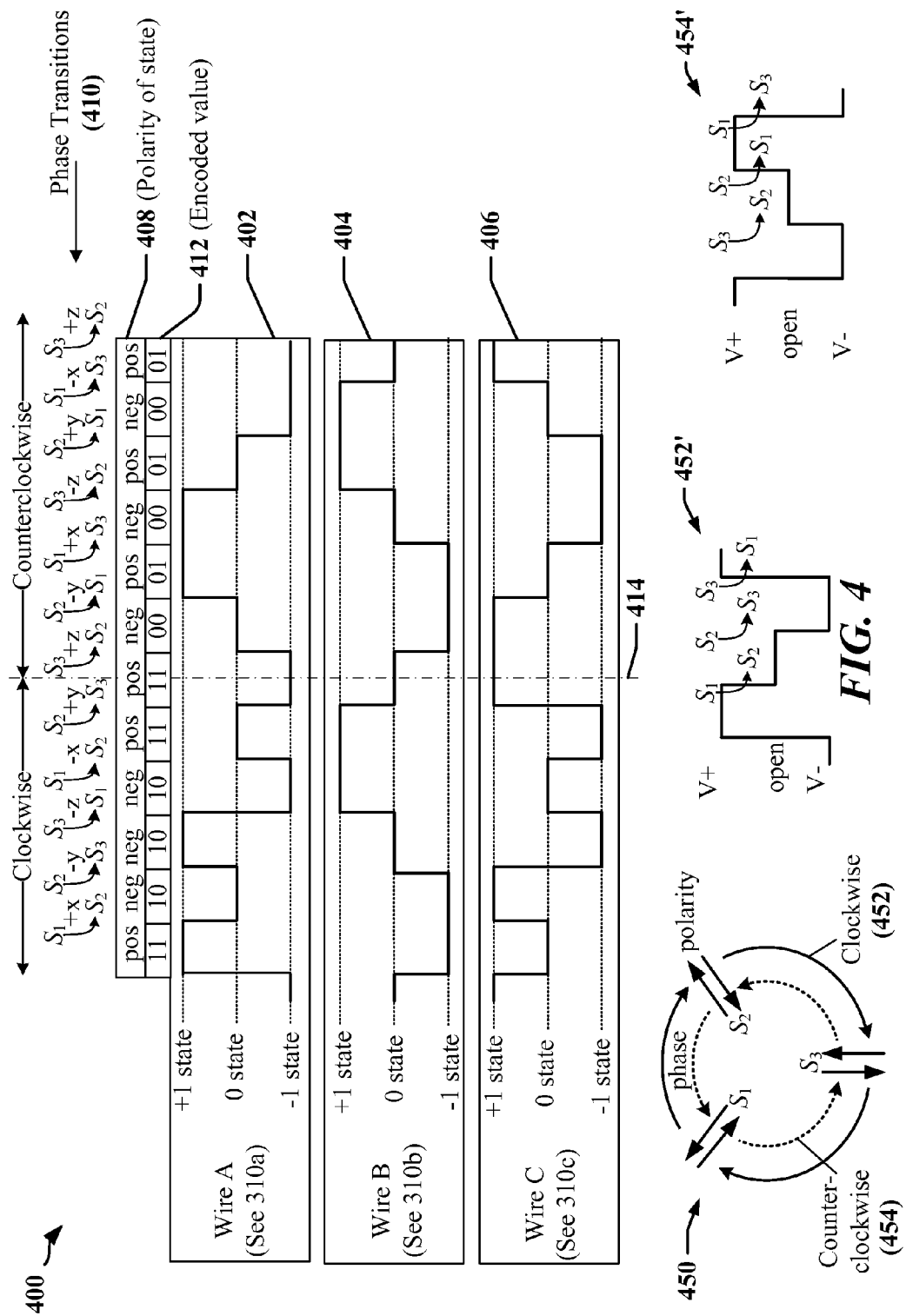
FIG. 4 illustrates signaling in an N-phase polarity encoded interface.

FIG. 4 is a diagram that includes an example of a timing chart 400 for signals encoded using a three-phase modulation data-encoding scheme, which is illustrated by the circular state diagram 450. Information may be encoded in a sequence of signaling states where, for example, a wire or connector is in one of three phase states $S_1$, $S_2$ and $S_3$ defined by the state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 454' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three wires 310a, 310b and 310c carry different phase-shifted versions of the same signal, where the versions are phase shifted by 120° with respect to one another. Each signaling state may be represented as a different voltage level on a wire or connector and/or a direction of current flow through the wire or connector. During each of the sequence of signaling states in a 3-wire system, each wire 310a, 310b and 310c is in a different signaling states than the other wires. When more than 3 wires 310a, 310b and 310c are used in a 3-phase encoding system, two or more wires 310a, 310b and/or 310c can be in the same signaling state at each signaling interval, although each state is present on at least one wire 310a, 310b and/or 310c in every signaling interval.

Information may be encoded in the direction of rotation at each phase transition 410, and the 3-phase signal may change direction for each signaling state. Direction of rotation may be determined by considering which wires 310a, 310b and/or 310c are in the '0' state (e.g., the undriven state) before and after a phase transition, because the undriven wire 310a, 310b and/or 310c changes at every signaling state in a rotating three-phase signal, regardless of the direction of rotation.

The encoding scheme may also encode information in the polarity (i.e., polarity of state 408) of the two of the conductors 310a, 310b and 310c that are actively driven. At any time in a 3-wire implementation, exactly two of the conductors 310a, 310b, 310c are driven with currents in opposite directions and/or with a voltage differential. In a simple implementation, data may be encoded using two bit values 412, where one bit is encoded in the direction of phase transitions 410 and the second bit is encoded in the polarity for the current state 408.

The timing chart 400 illustrates data encoding using both phase rotation direction and polarity. The curves 402, 404 and 406 relate to signals carried on three wires 310a, 310b and 310c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity (i.e., polarity of state 408) of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available for transition from any current state. Accordingly, there may be $\log_2(5) \cong 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| | | | | | |
|---|---|---|---|---|---|
| + + − − | + − − + | + − + − | − + − + | − + + − | − − + + |

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

Figure 5:
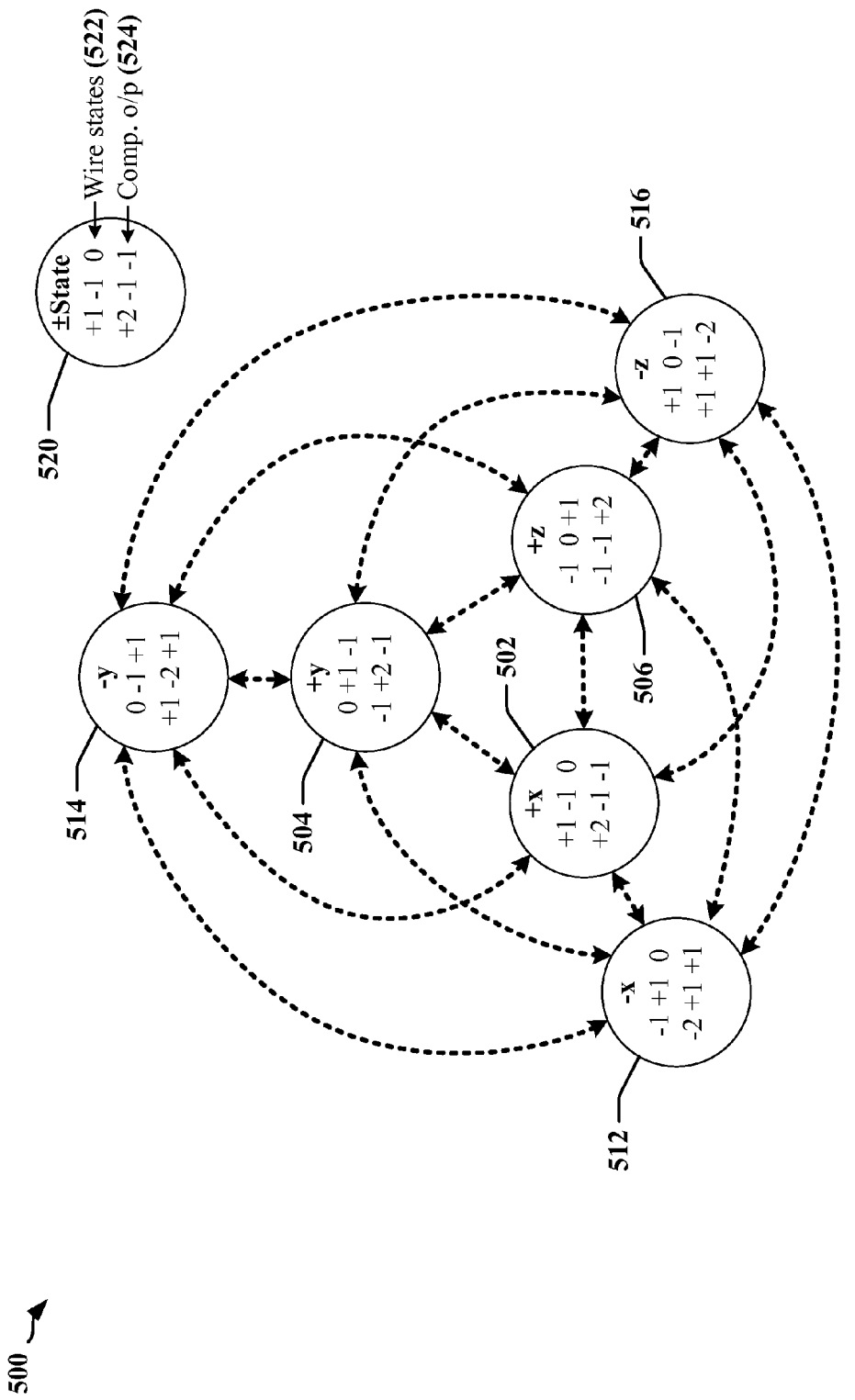
FIG. 5 is a state diagram illustrating potential state transitions in an M-wire N-phase polarity decoder.

FIG. 5 is a state diagram 500 illustrating 6 possible phase-polarity states and 30 possible state transitions in one example of a 3-wire, 3-phase communication link. The possible states 502, 504, 506, 512, 514 and 516 in the state diagram 500 include the states shown in the diagram 450 of FIG. 4. As shown in the example state element 520, each state 502, 504, 506, 512, 514 and 516 in the state diagram 500 includes a field 522 showing the signaling state of signals A, B and C (transmitted on wires 310a, 310b and 310c respectively), and a field 524 showing the result of a subtraction of wire voltages by differential receivers (such as the differential receivers 702a, 702b, 702c depicted in FIG. 7). For example, in state 502 (+x) wire A=+1, wire B=−1 and wire C=0, yielding output of differential receiver 702a (A−B)=+2, differential receiver 702b (B−C)=−1 and differential receiver 702c (C−A)=+1. As illustrated by the state diagram, transition decisions taken by state change detect circuitry 704 are based on 5 possible levels produced by differential receivers 702a, 702b and 702c, which include −2, −1, 0, +1 and +2 voltage states.

Figure 6:
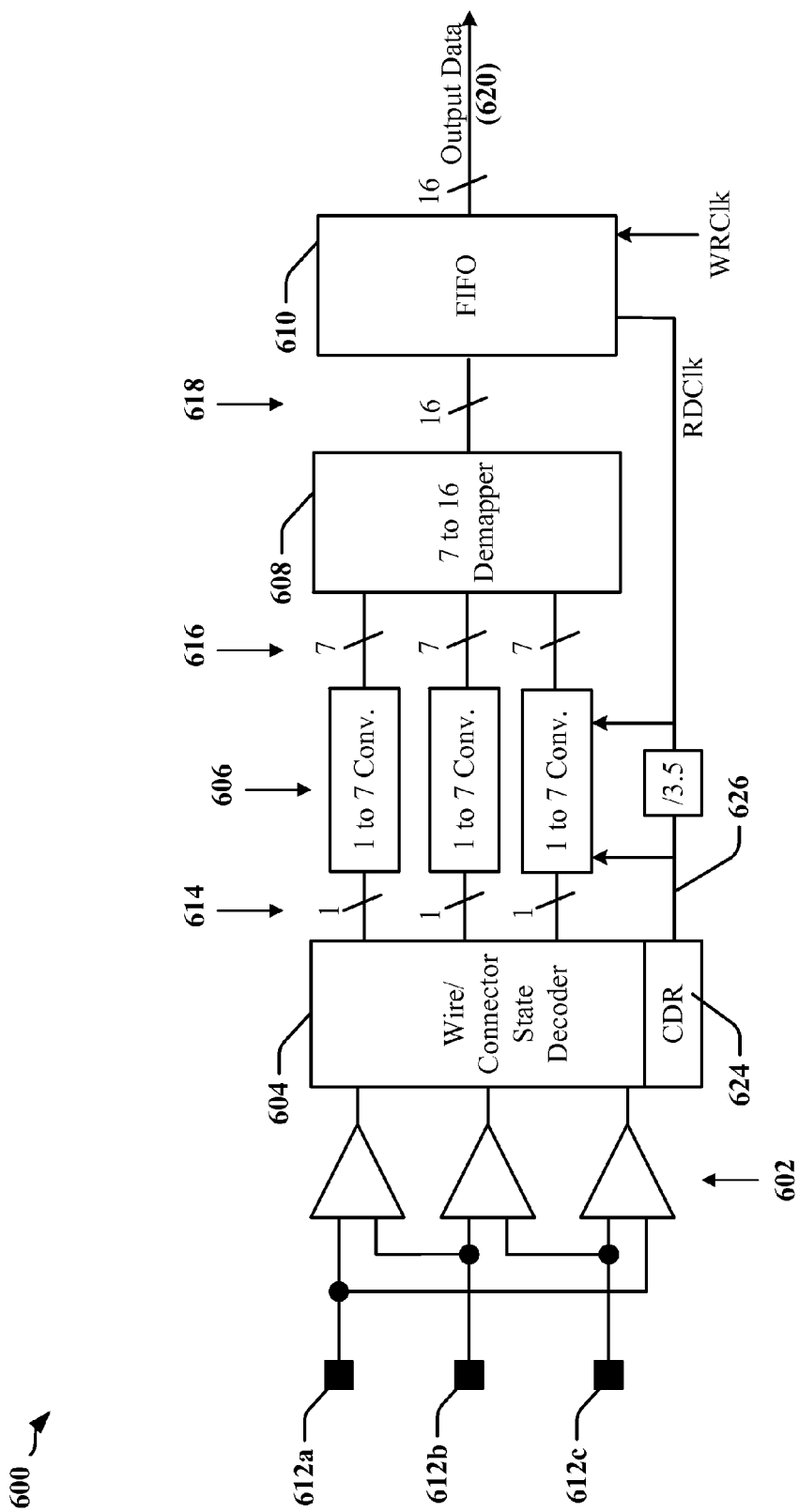
FIG. 6 illustrates a 3-wire N-phase polarity decoder.

FIG. 6 is a diagram illustrating certain aspects of a 3-wire, 3-phase decoder 600. Differential receivers 602 and a wire state decoder 604 are configured to provide a digital representation of the state of the three signal wires 612a, 612b and 612c, with respect to one another, and to detect changes in the signaling state of the three signal wires 612a, 612b and 612c compared to the signaling state of the three signal wires 612a, 612b and 612c in the previous symbol period. The digital representation of the signaling state of the three signal wires 612a, 612b and 612c during a symbol period may be referred to as a raw symbol. A sequence of seven consecutive raw symbols 614 are assembled by serial to parallel converters 606 to obtain a set of 7 symbols 616 to be processed by demapper 608. The demapper 608 produces 16 bits of output data 618 that may be buffered in FIFO 610 to provide output data 620.

In operation, the wire state decoder 604 may extract a sequence of symbols 614 from signals received on wires 612a, 612b and 612c. The symbols 614 are decoded based on signaling states that may be represented as a combination of phase rotation and polarity of the signals received on wires 612a, 612b and 612c, as disclosed herein. The wire state decoder may include a CDR 624, which extracts a clock 626 that can be used to reliably capture symbols from the wires 612a, 612b and 612c. The CDR 624 may be configured to generate the clock 626 based on the occurrence of a transition on least one of the wires 612a, 612b and 612c at each boundary between consecutive symbol intervals. An edge of the clock 626 may be delayed to allow time for all wires 612a, 612b and 612c to have stabilized and to thereby ensure that the current symbol is captured for decoding purposes.

The delay used by the CDR may be configured to allow a period of time sufficient to mask the effect of multiple edges generated at different times by the differential receivers 602. These multiple edges can arise when certain state transitions cause different differential receivers 602 to produce edges that may be separated in time with respect to one another. The CDR 624 may include a delay element that delays response to a first occurring edge at a symbol boundary until a time when all possible edges would have occurred. Variations in the performance of components of the CDR 624 may be expected to affect the delays between multiple edges, and these variations in performance of the CDR 624 may be accommodated by configuring a delay for the CDR 624 that accounts for worst case conditions. The variations in performance may be caused by changes in power, voltage and thermal (PVT) conditions, for example. The increased delay may limit the maximum clock speed usable in the communications link. If the configured delay is too short, then multiple clock pulses may be created for a single symbol, which may cause loss of synchronization between transmitter and receiver. If the delay is too long, symbol times may overlap, thereby causing the clock recovery circuit to malfunction or to generate a single pulse for two symbol intervals.

Figure 7:
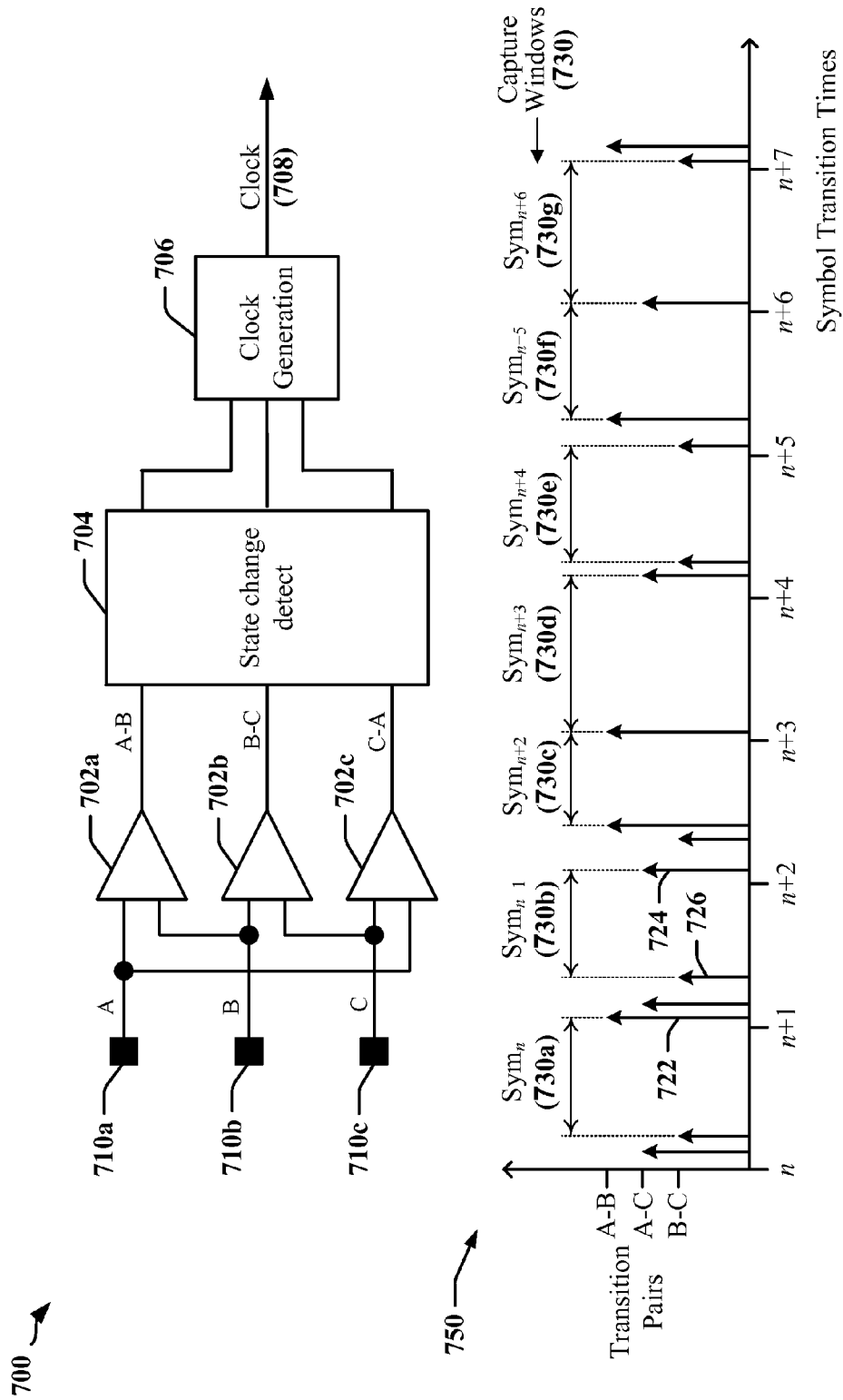
FIG. 7 illustrates transition detection in an M-wire N-phase polarity decoder.

FIG. 7 includes a block schematic diagram 700 illustrating certain aspects of clock generation in a 3-wire, 3-phase decoder. A set of differential receivers 702a, 702b and 702c compares each of three wires 710a, 710b and 710c with the other of the three wires 710a, 710b and 710c. In the example depicted, a first differential receiver 702a compares the signaling states of wires 710a and 710b, a second differential receiver 702b compares the states of wires 710b and 710c and a third differential receiver 702c compares the states of wires 710a and 710c. As described herein, signaling state of at least one of the wires 710a, 710b and 710c changes at each symbol boundary. Accordingly, a state change detection circuit 704 can detect the occurrence of a change in signaling state because the output of at least one of the differential receivers 702a, 702b and 702c changes at the end of each symbol interval.

Certain signaling state transitions may be detectable by a single differential receiver 702a, 702b or 702c, while other signaling state transitions may be detected by two or more of the differential receivers 702a, 702b and 702c. In one example the signaling states, or relative states of two wires may be unchanged after a transition and the output of a corresponding differential receiver 702a, 702b or 702c may also be unchanged after the symbol transition. In another example, both wires in a pair of wires A-B, B-C, and/or C-A may be in the same state in a first time interval and both wires may be in a same second state in a second time interval, such that the corresponding differential receiver 702a, 702b or 702c may be unchanged after the phase transition. Accordingly, a clock generation circuit 706 may include signaling state change detect circuits and logic 704 that monitor the outputs of all differential receivers 702a, 702b and 702c in order to determine when a signaling state transition has occurred, The clock generation circuit may generate a receive clock 708 based on detected signaling state transitions.

Changes in signaling states may be detected at different times on different wires 710a, 710b and/or 710c. The timing of detection of signaling state changes may vary according to the type of signaling state change that has occurred. The result of this variability is illustrated in the simplified timing chart/diagram 750 shown in FIG. 7. Markers 722, 724 and 726 representing the outputs of the signaling state change detection circuit 704 and/or differential receivers 702a, 702b and 702c are assigned different heights for clarity of illustration only. The relative heights of markers 722, 724 and 726 have no specific relationship to voltage or current levels, polarity or weighting values used for clock generation or data decoding. The timing chart 750 illustrates the effect of timing of transitions associated with symbols transmitted on the three wires 710a, 710b and 710c. In the timing chart 750, transitions between some symbols may result in variable capture windows 730a, 730b, 730c, 730d, 730e, 730f and/or 730g (collectively, the symbol capture windows 730) during which symbols may be reliably captured. The number of signaling state changes detected and their relative timing can result in jitter on the clock signal 708.

Figure 8:
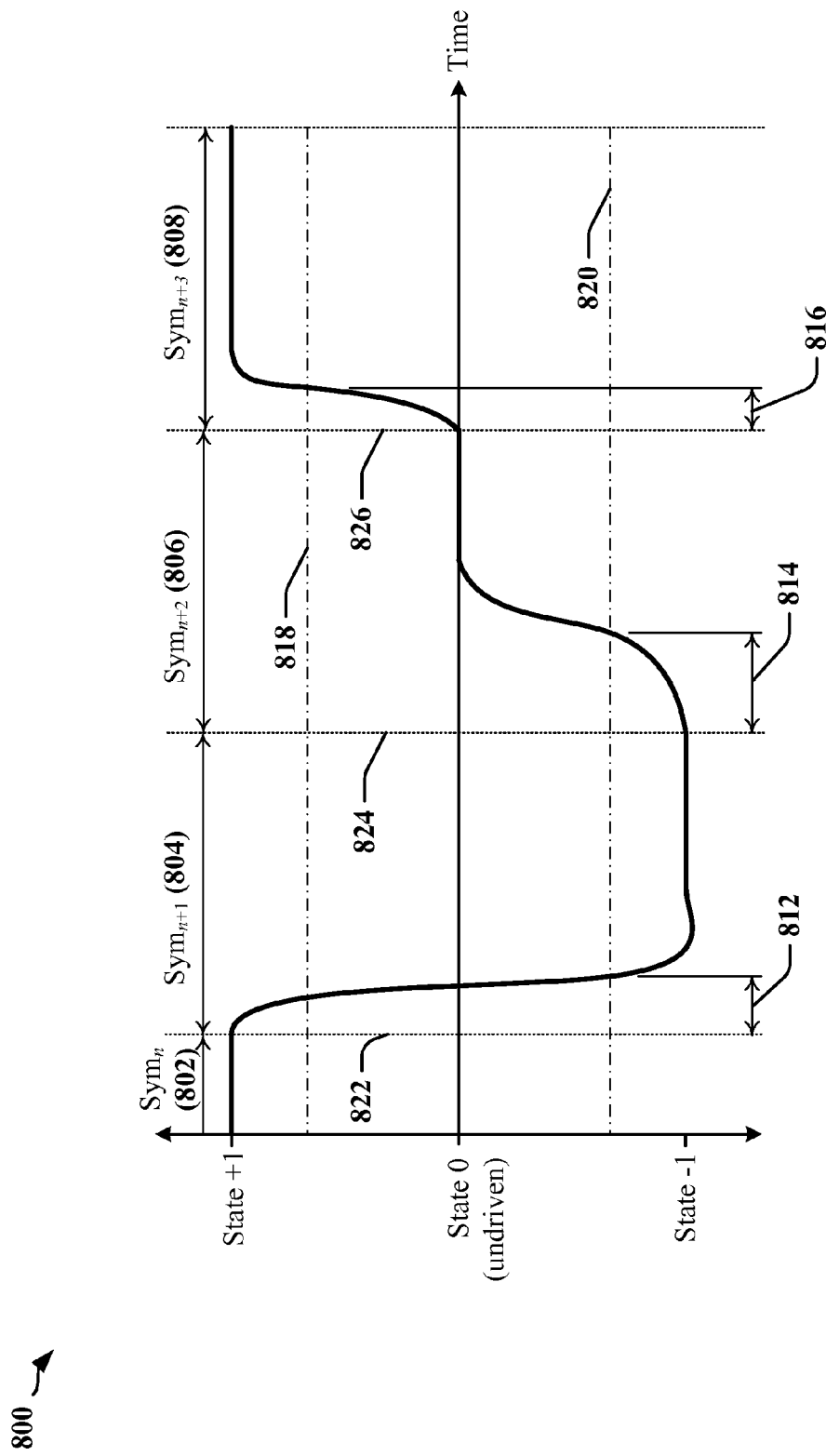
FIG. 8 is a simplified example of the effects of signal rise times on transition detection in an M-wire N-phase polarity decoder.

Variability in the sizes of the symbol windows 730 and jitter may be caused in part by the electrical characteristics of the wires 710a, 710b and 710c, as illustrated in the simple example 800 depicted in FIG. 8. Transition times may be affected by variability in signal rise times and/or variability in detection circuits caused by manufacturing process tolerances, variations and stability of voltage and current sources and operating temperature. Large variability in transition times can be attributed to the existence of different voltage or current levels in 3-phase signaling. A simplified "voltage-level" example is depicted in FIG. 8, which illustrates transition times in a single wire 710a, 710b or 710c. A first symbol (Sym$_n$) 802 may be transmitted in a symbol interval that ends at time 822, a second symbol (Sym$_{n+1}$) may be transmitted in a symbol interval that ends at time 824 and a third symbol (Sym$_{n+2}$) 806 may be transmitted in a symbol interval that ends at time 826, when transmission of a fourth symbol (Sym$_{n+3}$) 808 begins. The transition from a state determined by the first symbol 802 to the state corresponding to the second symbol 804 may be detected after a first delay 812 attributable to the time taken for voltage in the wire 710a, 710b or 710c to reach a threshold voltage 818 and/or 820. The threshold voltages may be used to determine the state of the wire 710a, 710b or 710c. The transition from a state determined by the second symbol 804 to the state for the third symbol 806 may be detected after a second delay 814 attributable to the time taken for voltage in the wire 710a, 710b or 710c to reach one of the threshold voltages 818 and/or 820. The transition from a state determined by the third symbol 806 to the state for the fourth symbol 808 may be detected after a third delay 816 attributable to the time taken for voltage in the wire 710a, 710b or 710c to reach a threshold voltage 818 and/or 820.

As depicted, the third delay 816 may be shorter than the first delay 812, and the second delay 814 may be the longest delay. The second delay 814 may be the longest delay because state 0 is an undriven state and the voltage in the wire 710a, 710b or 710c may drift slowly towards the threshold 820, whereas the first delay 812 and the second delay 816 are associated with transitions in which the wire 710a, 710b or 710c is actively pulled to the −1 and +1 states, respectively.

Figure 9:
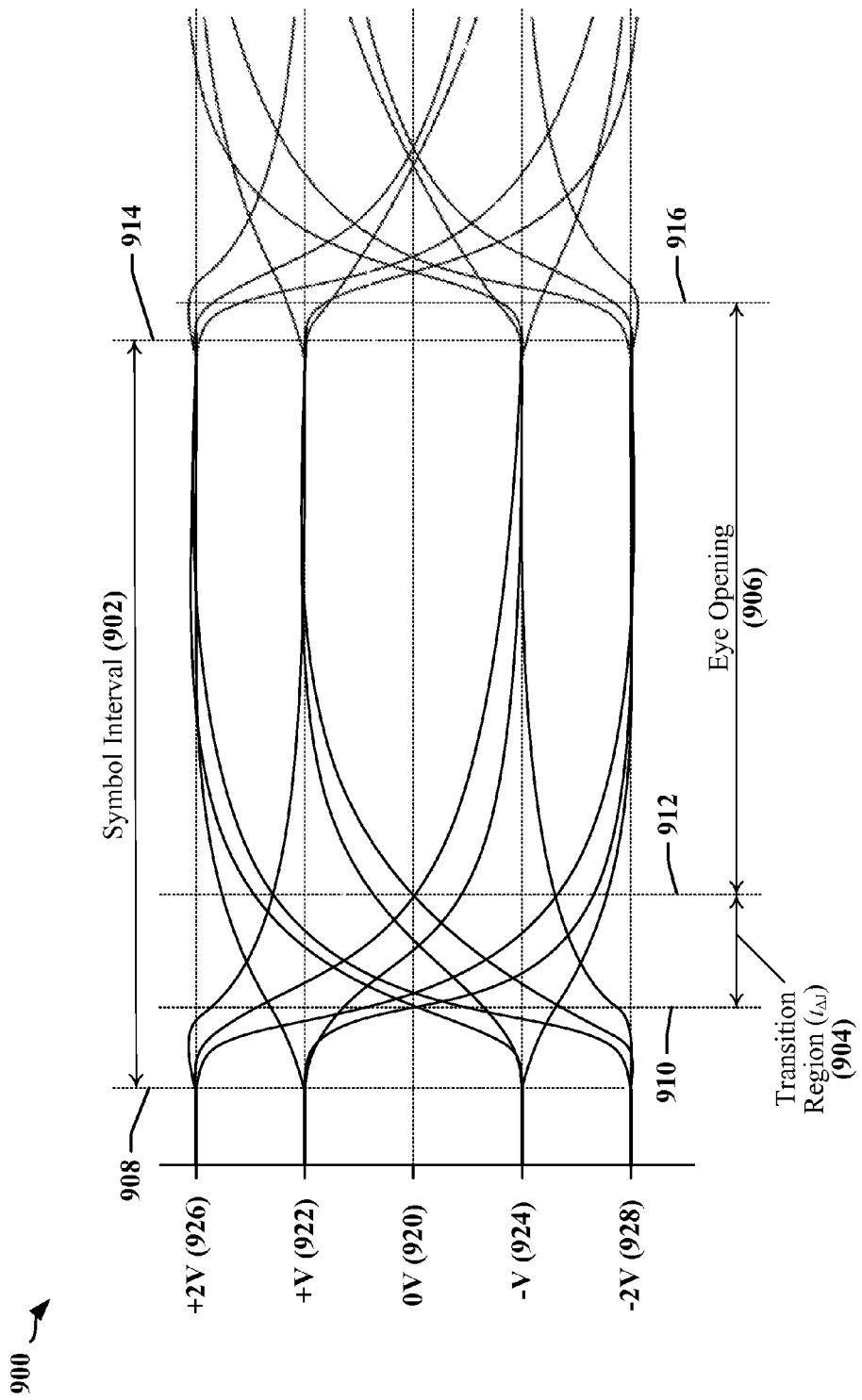
FIG. 9 is a diagram illustrating transition and eye regions in an M-wire N-phase polarity decoder.

FIG. 9 is a diagram showing simplified eye chart that may be generated from an overlay of multiple symbol intervals 902. A signal transition region 904 represents a time period of uncertainty where variable signal rise times prevent reliable decoding. State information may be determined reliably in an "eye opening" 906 representing the time period in which the symbol is stable and can be reliably received and decoded. In one example, the eye opening 906 may be determined to begin at the end 912 of the signal transition region 904, and end at the termination 914 of the symbol interval 902. In the example depicted in FIG. 9, the eye opening 906 may be determined to begin at the end 912 of the signal transition region 904, and end at a time 916 when the signaling state of the connectors (e.g., for the wires 710a, 710b, 710c) and/or the outputs of the three differential receivers 702a, 702b and 702c have begun to change.

The maximum speed of the communication link 220 configured for N-Phase encoding may be limited by the duration of the signal transition region 904 compared to the received signal eye opening 906. The minimum period for the symbol interval 902 may be constrained by tightened design margins associated with the CDR circuit 624 in the N-Phase decoder 600 illustrated in FIG. 6, or in the clock generation circuit 707 of FIG. 7, for example. Different signaling state transitions may be associated with different variations in signal transition times corresponding to two or more wires 710a, 710b and/or 710c, thereby causing the outputs of the differential receivers 702a, 702b and 702c in the receiving device to change at different times with respect to the symbol boundary 908, where the inputs to the differential receivers 702a, 702b and 702c begin to change. The large difference in received signal transition times between the outputs of multiple differential receivers 702a, 702b and 702c in the receiving device typically requires the implementation of a delay element in the CDR circuit 624 that has a minimum delay that exceeds the transition region time 904. In one example, a delay element may be provided in one or more of the state change detect circuit 704 and/or the clock generation circuit 706 shown in FIG. 7. The maximum delay time provided by this delay element may not exceed the closing edge 916 of the eye opening 906, which may be coincident with the commencement of the beginning of the next symbol interval at time 914 in some instances. At faster data rates, the eye opening 906 can become small in comparison to the symbol interval 902 and the effect of symbol transition variability may be determinative of the maximum symbol transmission rate.

The duration of any single transition is unlikely to span the full range of the signal transition region ($t_{\Delta J}$) 904, since it is unlikely that a minimum possible signal transition time and a maximum possible transition time occurs during a single symbol transition. In one example, the signal transition region 904 may be bounded by the time of the first zero crossing 910 detected at the output of a differential receiver 702a, 702b, or 702c and the time of the last zero crossing 912 detected at the output of a differential receiver 702a, 702b, or 702c, for all possible symbol transitions. The transition times observed at the outputs of the differential receiver 702a, 702b, and 702c correspond to the times taken for the connectors and/or wires 710a, 710b or 710c to reach a next state after the input to a driver 308 of the connector and/or wire 710a, 710b or 710c. The longest possible transition time may be determined based on the characteristics of the connector and/or wire 710a, 710b or 710c and the type of state transition involved. In one example, the longest possible transition time may be determined by the rise or fall time of a signal. Rise and fall times may be determined by the nature and voltage levels of the original and/or the final states. Typically, the longest possible transition time corresponds to a transition between an actively driven state and an undriven state.

A high value of $t_{\Delta J}$ for the transition region 904 can result in increased design difficulty associated with the CDR circuit 624 or clock generation circuit 706. For example, clock generation circuit 706 may employ a delay element or timer that is triggered by the first zero crossing of the three differential receiver outputs 702a, 702b and 702c. The state of the outputs of all three differential receivers 702a, 702b and 702c may not be safely sampled until all of the differential receivers 702a, 702b and 702c have reached their final state, which may be defined by the eye opening 906. Accordingly, the delay element or timer may be triggered at the start 910 or estimated start of the transition region 904, and ideally the timer expires shortly after the end 912 of the transition region 904, at which time clock generation circuit 706 may output a clock edge that is used to sample the outputs of the three differential receivers 702a, 702b and 702c.

In some systems, delay elements in the CDR circuit 624 can be afflicted by variations in manufacturing process, circuit supply voltage, and die temperature (PVT variation), and may generate delays that vary significantly. In such systems, the nominal operating condition of the CDR circuit 624 is generally set by design to generate a clock edge somewhere in the middle of the eye opening 906 in order to ensure that a clock edge occurs after the end 912 of the transition region 904 and prior to the commencement 914 of the transition region to the next symbol, even under worst case PVT effects. Difficulty can arise in designing a CDR circuit 624 that guarantees a clock edge within the eye opening 906 when the transition region 904 is large compared to the eye opening 906. For example, a typical delay element may produce a delay value that changes by a factor of 2 over all PVT conditions, and the eye opening 906 must be larger than the transition region 904 in order that a non-adjustable delay value can be chosen. According to certain aspects described herein, a dynamically configured delay may account for operational variations in the performance of the delay circuit.

Figure 10:
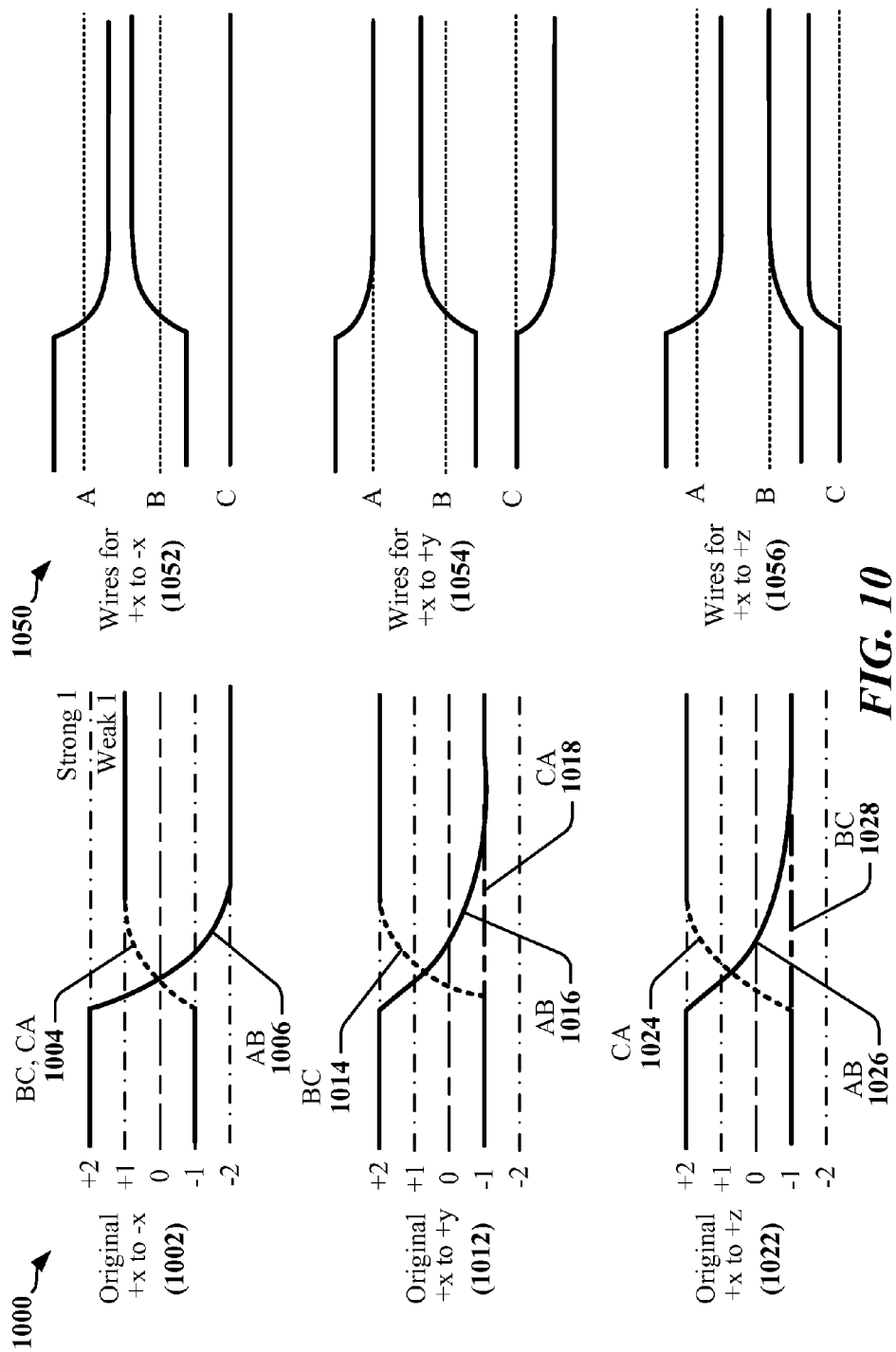
FIG. 10 includes timing charts illustrating variability of transition regions in N-phase polarity encoding.
Figure 11:
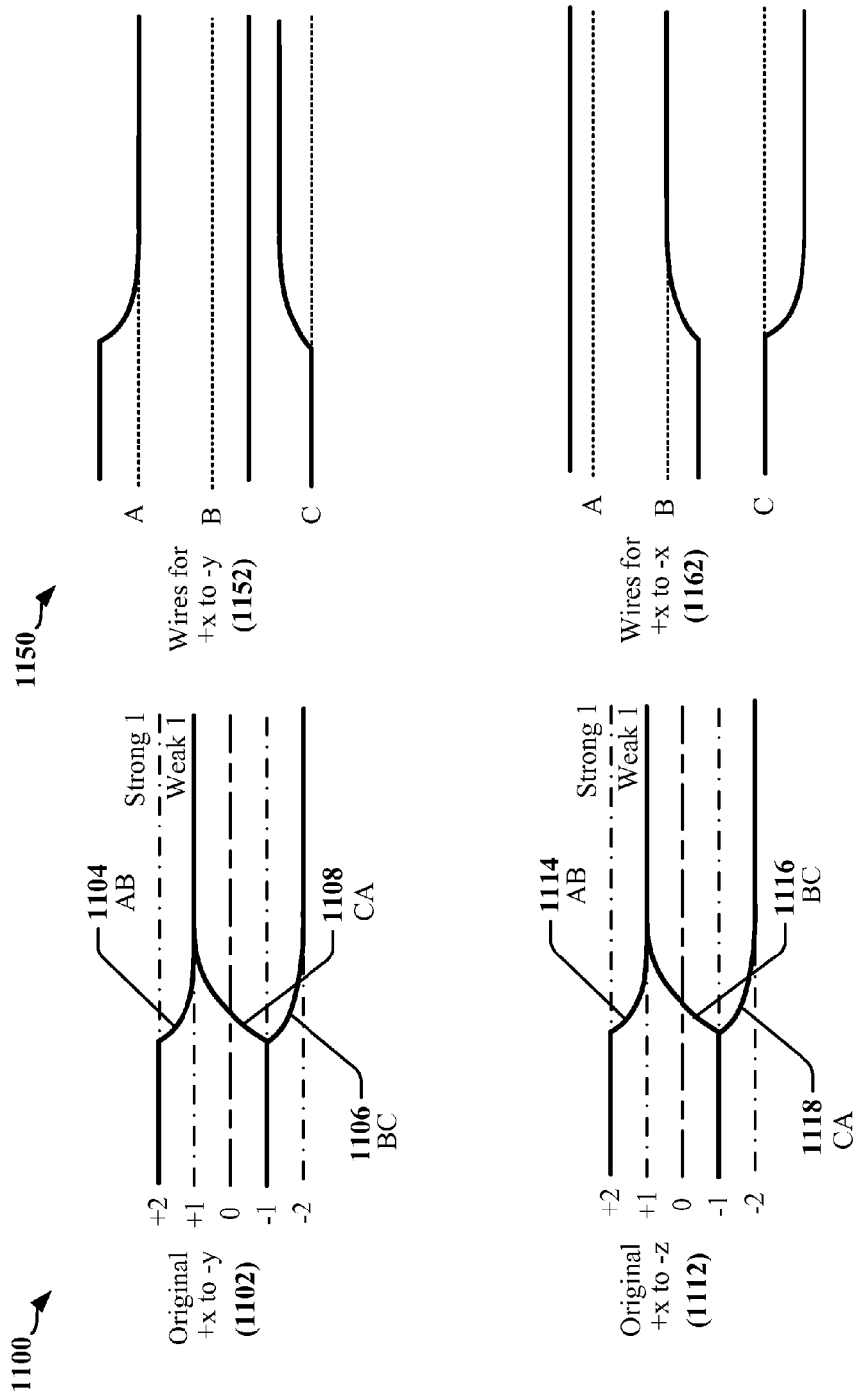
FIG. 11 includes timing charts illustrating transitions detectable by a single differential receiver used in and N-phase polarity decoder.

FIGS. 10 and 11 include timing charts 1000 and 1100 illustrating simplified examples of certain possible transitions from a first state to a second state. The initial state may be a driven state, with possible transitions to another driven state or to an undriven state. The examples illustrated in FIG. 10 describe alignment of transitions for the three state transitions +x to −x, +x to +y and +x to +z. The conditions that occur in these three state transitions may be present in 18 of the 30 possible state transitions shown in FIG. 5.

The timing charts 1002, 1012 and 1022 illustrate the outputs (AB, BC, CA) of the differential receivers 702a, 702b and 702c that are representative of the differences between pairs of the signal wires 710a, 710b and 710c coupled to the inputs of the differential receivers 702a, 702b and 702c. The timing charts 1002, 1012 and 1022, cover a time period before and after the signal transitions shown in the set of charts 1050. The timing charts 1002 and 1052 relate to a transition from symbol (+x) 502 to symbol (−x) 512 in which signal A transitions from a +1 state to a −1 state, signal B transitions from a −1 state to a +1 state and signal C remains at a 0 state. Accordingly, the AB differential receiver 702a may measure a +2 difference before the transition 1006 and a −2 difference after the transition 1006, the BC differential receiver 702b may measure a −1 difference before the transition 1004 and a +1 difference after the transition 1004, and the CA differential receiver 702c may measure a −1 difference before the transition 1004 and a +1 difference after the transition 1004. In this example, both transitions 1004 and 1006 have zero-crossings close in time, attributable to the final states being driven states.

The timing charts 1012 and 1054 relate to a transition from symbol (+x) 502 to symbol (+y) 504 in which signal A transitions from a +1 state to a 0 state, signal B transitions from a −1 state to a +1 state and signal C transitions from a 0 state to a −1 state. Accordingly, the AB differential receiver 702a may measure a +2 difference before the transition 1016 and a −1 difference after the transition 1016, the BC differential receiver 702b may measure a −1 difference before the transition 1014 and a +2 difference after the transition 1014, and the CA differential receiver 702c may measure a −1 difference before the transition 1018 and a −1 difference after the transition 1018 (effectively, no transition). In this example, the transitions 1014 and 1016 have zero-crossings that are separated by a significant period of time. The difference may occur because the BC transition 1014 involves two signals that have a final driven state while the AB transition 1016 relates to one signal that has a final undriven state.

The timing charts 1022 and 1056 relate to a transition from symbol (+x) 502 to symbol (+z) 506 in which signal A transitions from a +1 state to a −1 state, signal B transitions from a −1 state to a 0 state and signal C transitions from a 0 state to a +1 state. Accordingly, the AB differential receiver 702a may measure a +2 difference before the transition 1026 and a −1 difference after the transition 1026, the BC differential receiver 702b may measure a −1 difference before the transition 1028 and a −1 difference after the transition 1028 (effectively no transition), and the CA differential receiver 702c may measure a −1 difference before the transition 1024 and a +2 difference after the transition 1024. In this example, the transitions CA transition 1024 and the AB transition 1026 have zero-crossings that are separated by a significant period of time. The difference may be attributed to the CA transition 1024 involving signals A and C that both have a final driven state while the AB transition 1026 involves one signal (the B signal) that has a final undriven state.

The examples illustrated in FIG. 11 describe alignment of transitions for the state transitions +x to −y 1102, and +x to −z 1112. In these examples, for each transition illustrated, only one differential receiver 702a, 702b or 702c detects a zero crossing. The timing charts 1102 and 1112 illustrate the differences between signal wires 710a, 710b and 710c (signals A, B and C, respectively) measurable at the differential receivers 702a, 702b and 702c before and after the signal transitions shown in the set of charts 1150. The timing charts 1102 and 1152 relate to a transition from symbol (+x) 502 to symbol (−y) 514 in which signal A transitions from a +1 state to an undriven (0) state, signal B transitions from a −1 state to an (0) undriven state and signal C transitions from an undriven (0) state to a −1 state. Accordingly, only the CA differential receiver 702c observes a zero-crossing at the transition.

The timing charts 1112 and 1154 relate to a transition from symbol (+x) 502 to symbol (−z) 516 in which signal A remains at a +1 state, signal B remains at a −1 state and signal C transitions from a 0 state to a +1 state. Accordingly, only the BC differential receiver 702b observes a zero-crossing at the transition.

Variability in the rise and fall times of signals on a multi-wire interface and differences in performance of receivers monitoring the signals may result in a transition region 904 (see FIG. 9) during which multiple detections of the symbol transition may be produced. A CDR circuit 624 (see FIG. 6) may be configured to delay generation of a sample clock until after all possible transition detections have occurred. In one example, the CDR circuit may initiate a delay after the first detection of a symbol transition and may ignore or suppress further transitions during the delay period. The duration of the delay period can impact the maximum symbol transmission rate and can degrade performance if the delay period is unnecessarily long. According to certain aspects described herein, a training sequence or preamble may be provided that allows the delay period to be calibrated to an observed transition region 904. That is, the preamble may be used to determine the maximum variability between transition detections for various signaling state changes on different combinations of wires. A delay period calculated based the maximum variability of transition timing may be used to produce an optimal clock mask that can be used to suppress additional transitions occurring in the transition region 904. A preamble may be transmitted before each data transmission to enable dynamic recalibration of the clock mask, thereby accounting for variations caused by changes in PVT conditions during normal operation.

Figure 12:
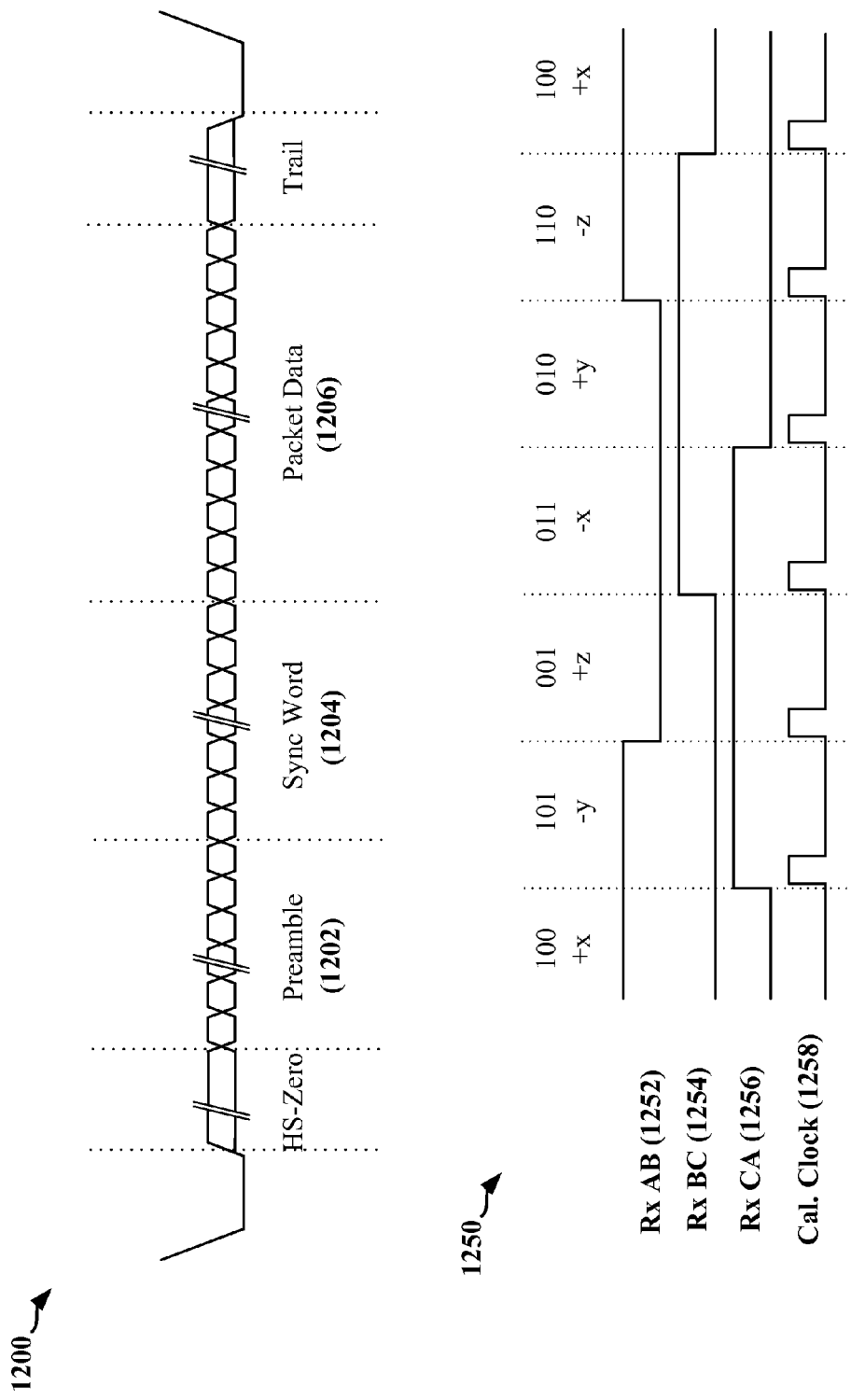
FIG. 12 includes timing charts illustrating an N-phase encoded transmission and an example of a preamble of the N-phase polarity encoded transmission.

With reference also to FIG. 12 and in accordance with certain aspects disclosed herein, a transmission on the M-wire, N-phase communications interface may include a preamble 1202 which generates a sequence of transitions, where each transition is detectable by only a single differential receiver 702a, 702b or 702c. The receiver may use this preamble 1202 to determine the period of the transmission clock and the receiver may optimize the delay used by a CDR 624 based on measurements of transition detection times using the preamble. The transmission clock and delay may then be used to decode the synchronization word 1204 and/or data in one or more packets 1206.

In the example of a 3-wire, 3-phase communication interface, the signaling state of the three wires 710a, 710b and 710c may be controlled by a preamble transmitted on the three wires 710a, 710b and 710c. The preamble may include the calibration sequence {+x, −y, +z, −x, +y, −z, +x . . . } and/or its counter-rotating version {+x, −z, +y, −x, +z, −y, +x . . . }. The timing chart 1250 illustrates the sequence {+x, −y, +z, −x, +y, −z, +x . . . }, showing the outputs 1252, 1254 and 1256 of the differential receivers 702a, 702b and 702c, as well as a calibration clock 1258 generated from the preamble 1202.

The calibration sequence in the preamble 1202 may be statically or dynamically defined. In one example, the transmitter and receiver may be precoded or preconfigured with a preamble 1202 that includes a series of transitions that generate one only one zero crossing in the differential receivers 702a, 702b and 702c. In another example, a preamble 1202 may include a programmable sequence that can be specified by a receiver and/or transmitter, and communicated using a separate control interface. The preamble pattern can be selected according to application needs.

Figure 13:
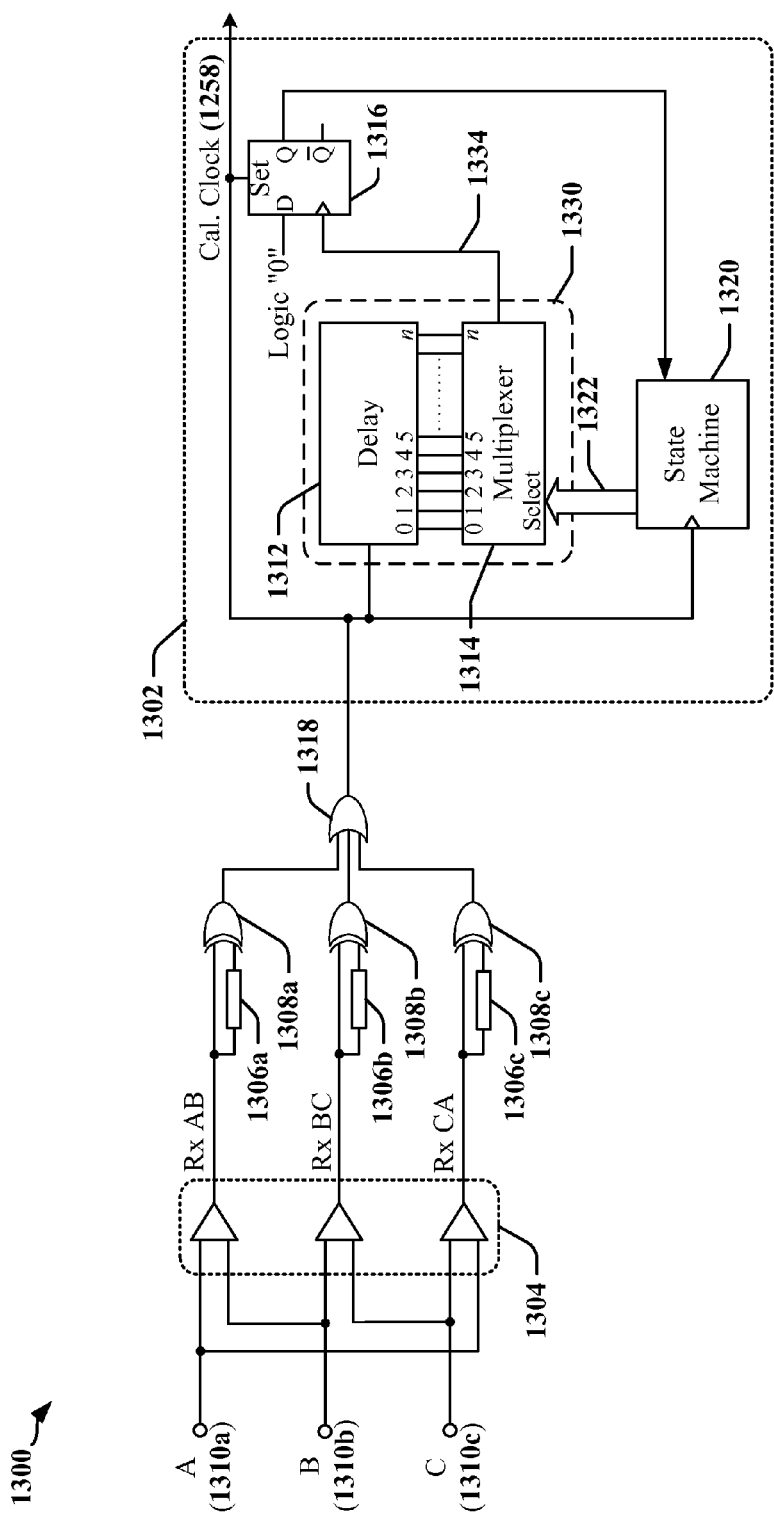
FIG. 13 is a simplified block diagram illustrating a calibration circuit used in an N-phase polarity decoder.

FIG. 13 is a block diagram 1300 illustrating a simplified calibration circuit 1302 that can be used to generate a calibration clock 1258. The calibration clock 1258 may be derived from transitions on one or more outputs of the three differential receivers 1304. The calibration circuit 1302 may be clocked by the calibration clock 1258. A calibration sequence in the preamble 1202 may be configured as a gray code such that the output of only one receiver 1304 changes at each transition.

In the illustrated 3-wire, 3-phase example, a state machine 1320 controls the operation of the calibration circuit 1302. Another type of controller or processing circuit may be used as desired or indicated by the application, including for example a processing circuit that employs a sequencer, an embedded processor, a digital signal processor and/or some other processing device. Signals representative of the electrical condition of the transmission lines are received at the inputs 1310a, 1310b and 1310c, and the signals are provided to the differential receivers 1304, which provide outputs that may represent the results of comparisons of all combinations of pairs of the inputs 1310a, 1310b and 1310c. Exclusive OR gates (XORs) 1308a, 1308b and 1308c compare the output of each of the differential receivers 1304 with a delayed version of the output the respective differential receiver 1304. The delayed version may be produced using delay elements 1306a, 1306b and 1306c. The outputs of the XORs 1308a, 1308b and 1308c provide pulsed signals where the width of the pulses have a duration or width corresponding to the delay introduced by the respective delay elements 1306a, 1306b and 1306c. An OR gate 1318 combines the outputs of the XORs 1308a, 1308b and 1308c to generate the calibration clock signal 1258, which includes all pulses corresponding to transitions detected for any pair of inputs 1302.

The calibration clock signal 1258 is provided to a programmable delay element 1330 that includes a clocked delay line 1312 and a multiplexer 1314. The time taken for a pulse on the calibration clock signal 1258 to pass through the delay element 1330 is determined by the value of the select input 1322 provided by the state machine 1320. Each pulse on the calibration clock signal 1258 activates the "set" input of a flip-flop that may be implemented using a "D" register 1316. The D register 1316 is reset when a first pulse in a delayed version 1334 of the calibration clock signal 1258 exits the delay element 1330. In the example, the multiplexer 1314 selects one of n progressively delayed outputs (delay taps) of the delay line 1312 as an output of the delay element 1330. The tap is selected by an input value 1322 controlled by the state machine 1320.

The state machine 1320 may be configured to determine a suitable delay value by conducting a search based on a successive approximation algorithm, a linear search algorithm, or another suitable search algorithm. The state machine 1320 may be configured to find the delay tap that approximates a delay interval corresponding to one symbol period, which may be expressed as the transmission clock frequency. A clock generator circuit 706 (see FIG. 7) may use this same delay interval to control the frequency of the receive clock and to determine when data is to be sampled. In one example, the clock generator circuit 706 may determine a sample point by subtracting an amount of delay from the symbol time so that the delay is safely contained within one symbol period.

A clock mask can be produced based on the receive clock period and a sampling delay, where the clock mask ensures data is sampled when signals at the input of the decoder have stabilized. Stability of the input signals can be assured regardless of PVT variations by calibrating the clock generator circuit 706 for every transmission. In this manner limitations on maximum speed of the circuit attributable to PVT variations of the clock mask delay can be alleviated.

In one example, the state machine 1320 may set the multiplexer select input 1322 to a relatively large value to detect the first pulse indicating a transition. In one example, the multiplexer select input 1322 may be set to a value lying in the middle of the range of possible values. For each subsequent pulse, the state machine 1320 may reduce or increase the multiplexer select input value 1322 until the period of the transmission clock is determined. The state machine 1320 may increase or decrease the select input 1322 by an increment that is halved for each subsequent change in the select input value. The period of the transmission clock may be determined when the first pulse associated with a transition exits the delay element 1330 after the last pulse associated with the same transition for every transition.

In practice, a pulse exiting the delay element 1330 clears the D register 1316 while a pulse in a delayed version 1334 of the calibration clock signal 1258 sets the D register 1316. The state machine 1320 monitors the output of the D register 1316 and may increase or "back off" the delay value as needed to obtain an optimized delay value. The state machine 1320 also monitors and responds to pulses in the calibration clock signal 1258 indicating a transition detected on a pair of the inputs 1302. In one example, the state machine is clocked by the calibration clock signal 1258. The state machine 1320 may be further adapted or configured to enable measurement of the transmission clock from the preamble 1202.

Figure 14:
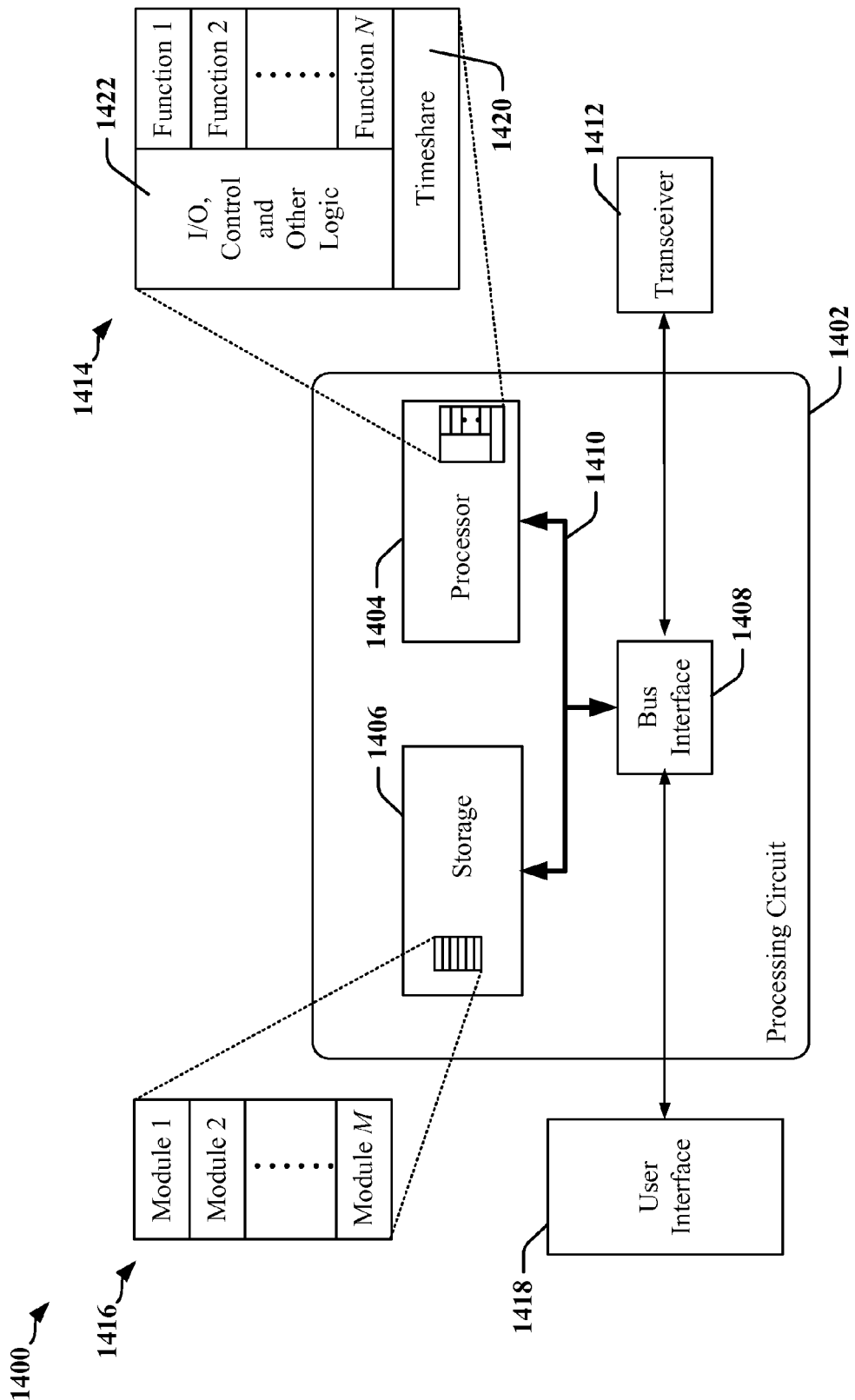
FIG. 14 is a block diagram illustrating an example of an apparatus employing a processing system that may be adapted according to certain aspects disclosed herein.

FIG. 14 is a conceptual diagram 1400 illustrating a simplified example of a hardware implementation for an apparatus employing a processing circuit 1402 that may be configured to perform one or more functions disclosed herein. In accordance with various aspects of the disclosure, an element, or any portion of an element, or any combination of elements as disclosed herein for three phase clock recovery delay calibration may be implemented using the processing circuit 1402. The processing circuit 1402 may include one or more processors 1404 that are controlled by some combination of hardware and software modules. Examples of processors 1404 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. For example, the processing circuit may be configured as channel processors, frame processors and other processors that are adapted to handle encoding and decoding of data for transmission on one or more wireless networks. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media. The bus 1410 may also link various other circuits such as timing sources, timers, peripherals, voltage regulators, and power management circuits. A bus interface 1408 may provide an interface between the bus 1410 and a transceiver 1412. The transceiver 1412 provides a means for communicating with various other apparatus over a transmission medium. Depending upon the nature of the apparatus, a user interface 1418 (e.g., keypad, display, speaker, microphone, joystick) may also be provided, and may be communicatively coupled to the bus 1410 directly or through a bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer readable medium. The computer-readable medium and/or storage 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as the transceiver 1412, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to the transceiver, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

Figure 15:
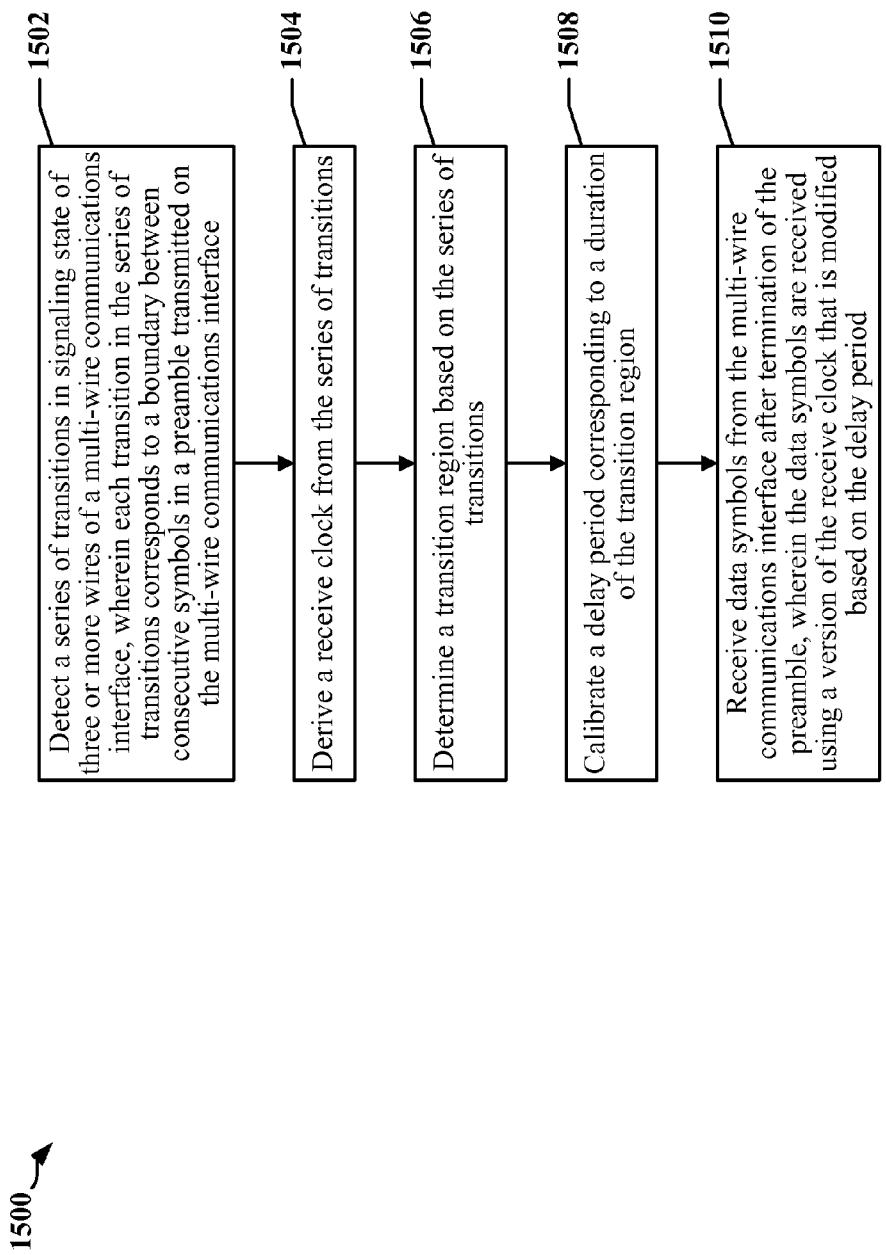
FIG. 15 is a flow chart of a method for M-wire N-phase signal transition alignment.

FIG. 15 is a flowchart illustrating a calibration method for an M-wire, N-phase communications link. At step 1502, a series of transitions may be detected in the signaling state of three or more wires of a multi-wire communications interface. Each transition in the series of transitions may correspond to a boundary between consecutive symbols in a preamble transmitted on the multi-wire communications interface. Each transition in the series of transitions may be detected by a single one of a plurality of detectors. Each detector in the plurality of detectors may be configured to determine a difference between signaling state of two wires of the multi-wire communications interface. The two wires may carry different versions of a multiphase signal. The plurality of detectors may include differential receivers, and each differential receiver may be configured to receive signals from a different pair of wires than the other differential receivers.

At step 1504, a receive clock may be derived from the series of transitions. The receive clock may be derived using a CDR, for example.

At step 1506, a transition region may be determined based on the series of transitions. The transition region may correspond to a period of time during which the signaling states of the wires of the multi-wire communications interface are changing or unstable.

At step 1508, a delay period corresponding to a duration of the transition region may be calibrated. The delay period may be calibrated by estimating differences in timing between transitions in the series of transitions, and calculating the delay period based on a maximum one of the differences in timing. The differences in timing between transitions in the series of transitions may be estimated relative to the receive clock. The delay period may be calibrated using a successive approximation algorithm or a linear search algorithm.

At step 1510, data symbols may be received from the multi-wire communications interface after termination of the preamble. The data symbols may be received using a version of the receive clock that is modified based on the delay period. The data symbols may be received by capturing the signaling state of the wires of the multi-wire communications interface in the CDR or using a clock produced by the CDR. The data symbols may be received by detecting a first-detected transition corresponding to a boundary between a first data symbol and a second data symbol, and ignoring other transition detections for a period of time defined by the delay period. The other transition detections may correspond to the boundary between the first data symbol and the second data symbol. A data symbol may be captured after expiration of the delay period.

In one example, the preamble is based on a gray code. The preamble may include a sequence of symbols identified in control information communicated between a transmitting device and a receiving device coupled to the multi-wire communications interface.

Figure 16:
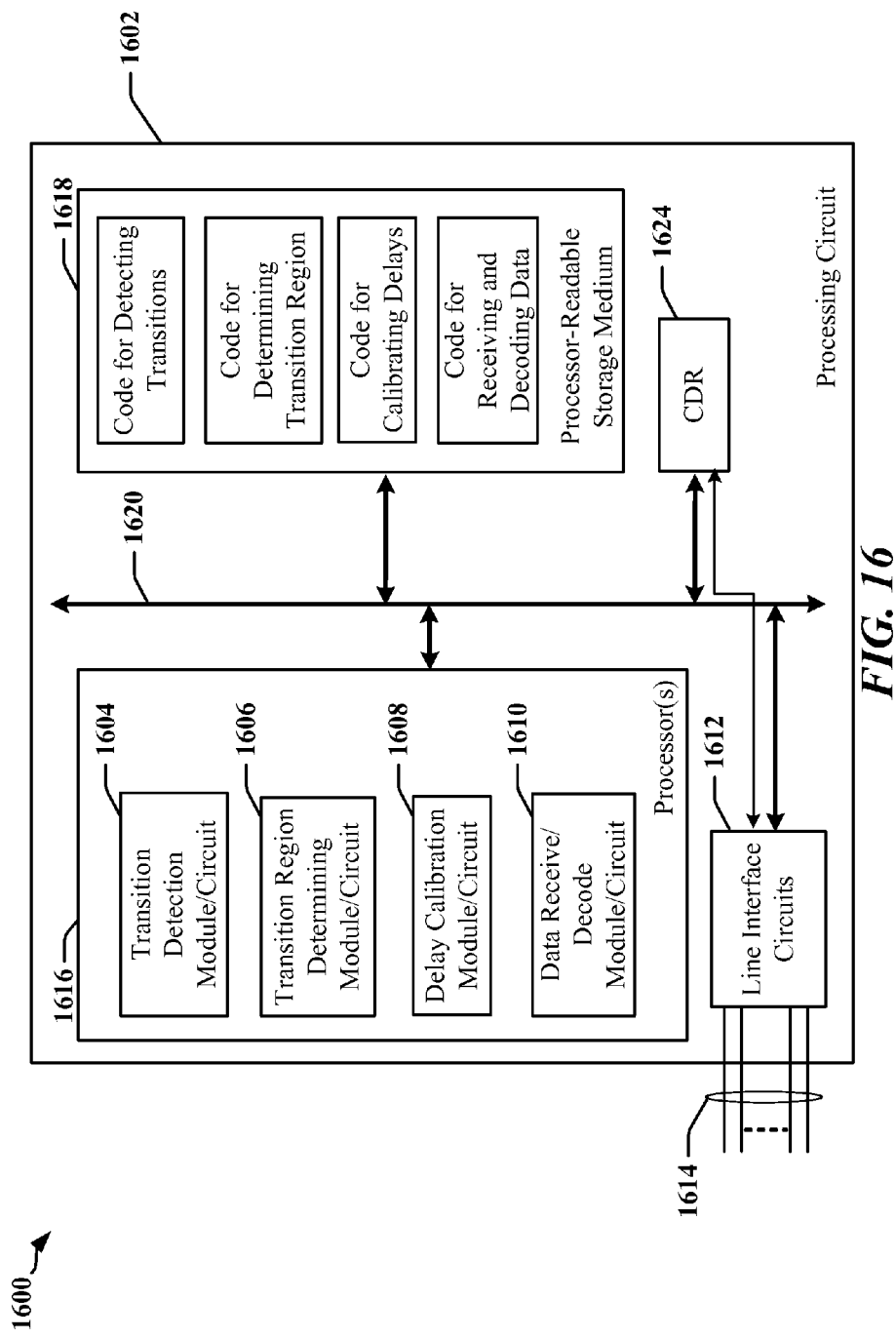
FIG. 16 is a diagram illustrating an example of a hardware implementation for an apparatus employing an M-wire N-phase clock calibration circuit.

FIG. 16 is a diagram 1600 illustrating a simplified example of a hardware implementation for an apparatus employing a processing circuit 1602, which may include a sequencer or state machine. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the processor 1616, the modules or circuits 1604, 1606 and 1608, line interface circuits 1612 configurable to communicate over connectors or wires 1614 and the computer-readable storage medium 1618. The bus 1620 may also link various other circuits such as timing sources, peripherals, voltage regulators, and power management circuits. A CDR 1624 may be connected to the bus.

The processor 1616 is responsible for general processing, including the execution of software stored on the computer-readable storage medium 1618. The software, when executed by the processor 1616, causes the processing circuit 1602 to perform the various functions described supra for any particular apparatus. The software, when executed by the processor 1616, may cause the processing circuit 1602 to control logic and devices that are adapted to perform one or more of the various functions described supra. The computer-readable storage medium 1618 may also be used for storing data that is manipulated by the processor 1616 when executing software. The processing circuit 1602 further includes at least one of the modules 1604, 1606, 1608, and 1610. The modules 1604, 1606, 1608, and 1610 may be software modules running in the processor 1616, resident/stored in the computer readable storage medium 1618, one or more hardware modules coupled to the processor 1616, or some combination thereof. The modules 1604, 1606, 1608, and 1610 may include microcontroller instructions, state machine configuration parameters, or some combination thereof.

In one configuration, the apparatus processing circuit for wireless communication includes modules and/or circuits 1604, 1614 configured to detect a series of transitions in signaling state of three or more wires of a multi-wire communications interface 1614, a module and/or circuit 1624 that is configured to derive a receive clock from the series of transitions, modules and/or circuits 1606, 1614, 1624 configured to determine a transition region based on the series of transitions, a module and/or circuit 1608 that is configured to calibrate a delay period corresponding to a duration of the transition region, and modules and/or circuits 1610, 1624 configured to receive and/or decode data symbols from the multi-wire communications interface 1614 after termination of the preamble.

The aforementioned means may be implemented, for example, using some combination of a processor 206 or 236, physical layer drivers 210 or 240 and storage media 208 and 238.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A calibration method, comprising:
    detecting a series of transitions in signaling state of three or more wires of a multi-wire communications interface, wherein each transition in the series of transitions corresponds to a boundary between consecutive symbols in a preamble transmitted on the multi-wire communications interface;
    deriving a receive clock from the series of transitions;
    determining a transition region based on the series of transitions;
    calibrating a delay period corresponding to a duration of the transition region; and receiving data symbols from the multi-wire communications interface after termination of the preamble, wherein the data symbols are received using a version of the receive clock that is modified based on the delay period.

2. The calibration method of claim 1, wherein receiving the data symbols comprises:
detecting a first-detected transition corresponding to a boundary between a first data symbol and a second data symbol; and
ignoring other transition detections for a period of time defined by the delay period, wherein the other transition detections correspond to the boundary between the first data symbol and the second data symbol.

3. The calibration method of claim 1, wherein calibrating the delay period comprises:
estimating differences in timing between transitions in the series of transitions; and
calculating the delay period based on a maximum one of the differences in timing.

4. The calibration method of claim 3, wherein the differences in timing between transitions in the series of transitions are estimated relative to the receive clock.

5. The calibration method of claim 1, wherein each transition in the series of transitions is detected by a single one of a plurality of detectors, and wherein each detector in the plurality of detectors is configured to determine a difference between signaling state of two wires of the multi-wire communications interface.

6. The calibration method of claim 5, wherein the two wires carry different versions of a multiphase signal.

7. The calibration method of claim 5, wherein the plurality of detectors comprises differential receivers, wherein each differential receiver is configured to receive signals from a different pair of wires than the other differential receivers.

8. The calibration method of claim 1, wherein the preamble is based on a gray code.

9. The calibration method of claim 1, wherein the preamble comprises a sequence of symbols identified in control information communicated between a transmitting device and a receiving device coupled to the multi-wire communications interface.

10. The calibration method of claim 1, wherein the delay period is calibrated using a successive approximation algorithm or a linear search algorithm.

11. An apparatus comprising:
means for detecting a series of transitions in signaling state of three or more wires of a multi-wire communications interface, wherein each transition in the series of transitions corresponds to a boundary between consecutive symbols in a preamble transmitted on the multi-wire communications interface;
means for deriving a receive clock from the series of transitions;
means for determining a transition region based on the series of transitions;
means for calibrating a delay period corresponding to a duration of the transition region; and
means for receiving data symbols from the multi-wire communications interface after termination of the preamble, wherein the data symbols are received using a version of the receive clock that is modified based on the delay period.

12. The apparatus of claim 11, wherein the means for receiving the data symbols is configured to:

detect a first-detected transition corresponding to a boundary between a first data symbol and a second data symbol; and
ignore at least one other transition corresponding to the boundary between the first data symbol and the second data symbol that is detected within a period of time defined by the delay period.

13. The apparatus of claim 11, wherein the means for calibrating the delay period is configured to:
estimate differences in timing between transitions in the series of transitions; and
calculate the delay period based on a maximum one of the differences in timing.

14. The apparatus of claim 11, wherein the means for detecting the series of transitions in signaling state comprises a plurality of detectors, wherein each transition in the series of transitions is detected by a single one of a plurality of detectors, and wherein each detector in the plurality of detectors is configured to determine a difference between signaling state of two wires of the multi-wire communications interface.

15. The apparatus of claim 14, wherein the plurality of detectors comprises differential receivers, each differential receiver receiving signals from a different pair of wires than the other differential receivers.

16. The apparatus of claim 11, wherein the means for receiving data symbols is configured to:
use a clock mask based on the delay period, wherein the clock mask accommodates differences in timing between two or more of successive symbols in a sequence of symbols in the preamble by blocking detection of multiple transitions at a boundary between a first data symbol and a second data symbol.

17. An apparatus, comprising:
a processing circuit configured to:
detect a series of transitions in signaling state of three or more wires of a multi-wire communications interface, wherein each transition in the series of transitions corresponds to a boundary between consecutive symbols in a preamble transmitted on the multi-wire communications interface;
derive a receive clock from the series of transitions;
determine a transition region based on the series of transitions;
calibrate a delay period corresponding to a duration of the transition region; and
receive data symbols from the multi-wire communications interface after termination of the preamble, wherein the data symbols are received using a version of the receive clock that is modified based on the delay period.

18. The apparatus of claim 17, wherein the processing circuit is configured to:
detect a first-detected transition corresponding to a boundary between a first data symbol and a second data symbol; and
ignore other detected transitions corresponding to the boundary between the first data symbol and the second data symbol for a period of time defined by the delay period.

19. The apparatus of claim 17, wherein the processing circuit is configured to:
estimate differences in timing between transitions in the series of transitions; and
calculate the delay period based on a maximum one of the differences in timing.

20. The apparatus of claim 19, wherein the differences in timing between transitions in the series of transitions are estimated relative to the receive clock.

21. The apparatus of claim 17, wherein the processing circuit is configured to detect the series of transitions in signaling state of the three or more wires using a plurality of detectors coupled to the processing circuit, wherein each detector is configured to determine a difference between signaling state of two wires of the multi-wire communications interface, and wherein each transition in the series of transitions is detected by a single detector in the plurality of detectors.

22. The apparatus of claim 21, wherein the two wires carry different versions of a multiphase signal.

23. The apparatus of claim 21, wherein the plurality of detectors comprises differential receivers, wherein each differential receiver is configured to receive signals from a different pair of wires than the other differential receivers.

24. A non-transitory processor-readable storage medium having one or more instructions which, when executed by at least one processing circuit, cause the at least one processing circuit to:
    detect a series of transitions in signaling state of three or more wires of a multi-wire communications interface, wherein each transition in the series of transitions corresponds to a boundary between consecutive symbols in a preamble transmitted on the multi-wire communications interface;
    derive a receive clock from the series of transitions;
    determine a transition region based on the series of transitions;
    calibrate a delay period corresponding to a duration of the transition region; and
    receive data symbols from the multi-wire communications interface after termination of the preamble, wherein the data symbols are received using a version of the receive clock that is modified based on the delay period.

25. The storage medium of claim 24, wherein the storage medium includes instructions for causing the at least one processing circuit to:
    detect a first-detected transition corresponding to a boundary between a first data symbol and a second data symbol; and
    for a period of time defined by the delay period, ignoring other detected transitions corresponding to the boundary between the first data symbol and the second data symbol.

26. The storage medium of claim 24, wherein the storage medium includes instructions for causing the at least one processing circuit to:
    estimate differences in timing between transitions in the series of transitions; and
    calculate the delay period based on a maximum one of the differences in timing.

27. The storage medium of claim 26, wherein the differences in timing between transitions in the series of transitions are estimated relative to the receive clock.

28. The storage medium of claim 24, wherein each transition in the series of transitions is detected by a single one of a plurality of detectors, wherein each detector in the plurality of detectors is configured to determine a difference between signaling state of two wires of the multi-wire communications interface.

29. The storage medium of claim 28, wherein the two wires carry different versions of a multiphase signal.

30. The storage medium of claim 28, wherein the plurality of detectors comprises differential receivers, each differential receiver receiving signals from a different pair of wires than the other differential receivers.

* * * * *